US012795470B2

(12) United States Patent
Purkayastha et al.

(10) Patent No.: US 12,795,470 B2
(45) Date of Patent: Nov. 10, 2026

(54) DIRECT DATA FORWARDING FOR USER EQUIPMENT HANDOVER

(71) Applicant: QUALCOMM Incorporated, San Diego, CA (US)

(72) Inventors: Punyaslok Purkayastha, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 367 days.

(21) Appl. No.: 18/421,677

(22) Filed: Jan. 24, 2024

(65) Prior Publication Data

US 2024/0276321 A1 Aug. 15, 2024

Related U.S. Application Data

(60) Provisional application No. 63/484,834, filed on Feb. 14, 2023.

(51) Int. Cl.
*H04W 36/00* (2009.01)
*H04W 36/08* (2009.01)

(52) U.S. Cl.
CPC ....... *H04W 36/0069* (2018.08); *H04W 36/08* (2013.01)

(58) Field of Classification Search
CPC .. H04W 36/0069; H04W 36/08; H04W 36/02
See application file for complete search history.

(56) References Cited

U.S. PATENT DOCUMENTS

| | | | | |
|---|---|---|---|---|
| 2022/0287126 A1* | 9/2022 | Orsino | .................. | H04W 76/16 |
| 2022/0322167 A1* | 10/2022 | Liu | ................. | H04W 36/00698 |
| 2023/0300691 A1* | 9/2023 | Eklöf | ................ | H04W 36/0061 370/331 |
| 2025/0234254 A1* | 7/2025 | Liu | ................... | H04W 36/0064 |
| 2025/0274836 A1* | 8/2025 | Wu | ................... | H04W 36/0069 |
| 2025/0287278 A1* | 9/2025 | Xu | ......................... | H04W 36/02 |
| 2026/0025729 A1* | 1/2026 | Pan | ..................... | H04W 36/362 |

FOREIGN PATENT DOCUMENTS

| | | | | |
|---|---|---|---|---|
| WO | WO-2023213390 A1 * | 11/2023 | .......... | H04W 36/362 |
| WO | WO-2024027981 A1 * | 2/2024 | .......... | H04W 36/023 |

* cited by examiner

*Primary Examiner* — Habte Mered
(74) *Attorney, Agent, or Firm* — Holland & Hart LLP

(57) ABSTRACT

Methods, systems, and devices for wireless communication are described. A target master node of a wireless communications system may receive a handover request that corresponds to a user equipment (UE). The target master node may transmit, responsive to the handover request and to a target secondary node associated with the target master node, via a first message, a secondary node identifier for a source secondary node associated with the source master node. The target master node may receive, via a second message responsive to the first message, information indicative of whether a direct data forwarding path is available between the target secondary node and the source secondary node. The source master node may relay at least one direct data forwarding address to the source secondary node to use for direct data forwarding, for the UE, to at least one of the target master node or the target secondary node.

19 Claims, 13 Drawing Sheets

200

200

900

DIRECT DATA FORWARDING FOR USER EQUIPMENT HANDOVER

CROSS REFERENCE

The present Application for Patent claims the benefit of U.S. Provisional Patent Application No. 63/484,834 by PURKAYASTHA et al., entitled "DIRECT DATA FORWARDING FOR USER EQUIPMENT HANDOVER," filed Feb. 14, 2023, assigned to the assignee hereof, and expressly incorporated by reference herein.

FIELD OF TECHNOLOGY

The following relates to wireless communication, including direct data forwarding for user equipment handover.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Dual connectivity allows a user equipment (UE) to communicate with a master node and a secondary node. In some cases, a UE may perform a handover procedure to select a new master node and secondary node (target nodes). Data forwarding is used to communicate data between nodes of a network to support communications with a UE during a handover procedure. For example, during the handover procedure, network data is being communicated from the network to the source network node for communication to the UE. Such data may be communicated to the target network nodes for communication to the UE.

SUMMARY

The described techniques relate to improved methods, systems, devices, and apparatuses that support direct data forwarding for user equipment handover. For example, the described techniques provide for a target master node of a wireless communications system receiving a handover request that corresponds to a user equipment (UE). The target master node may transmit, responsive to the handover request and to a target secondary node associated with the target master node, via a first message, a secondary node identifier for a source secondary node associated with the source master node. The target master node may receive, via a second message responsive to the first message, information indicative of whether a direct data forwarding path is available between the target secondary node and the source secondary node. The source master node may relay at least one direct data forwarding address to the source secondary node to use for direct data forwarding, for the UE, to at least one of the target master node or the target secondary node.

DETAILED DESCRIPTION

Figure 1:
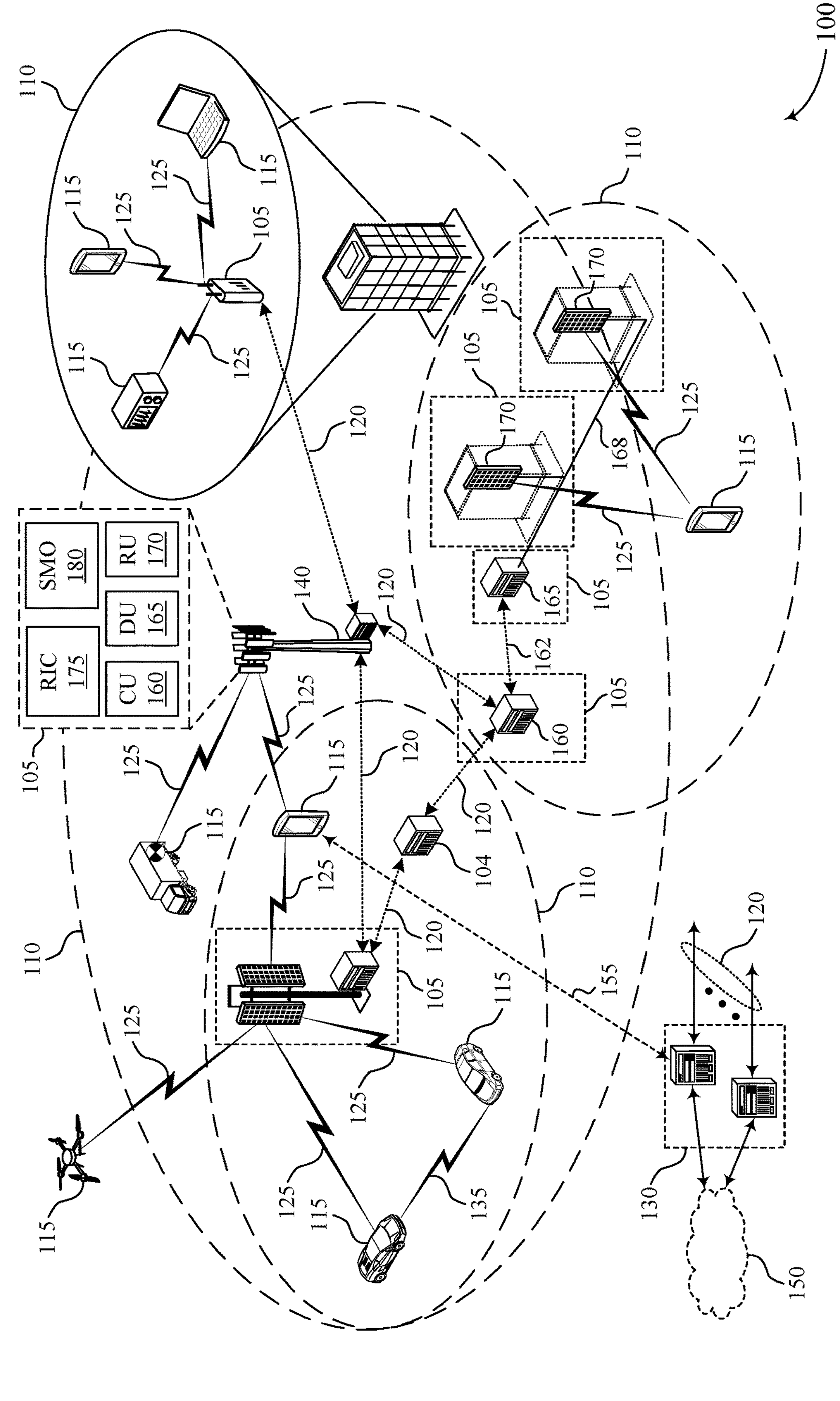
FIG. 1 illustrates an example of a wireless communications system that supports direct data forwarding for user equipment handover in accordance with one or more aspects of the present disclosure.

Dual connectivity allows a user equipment (UE) to communicate with a master node and a secondary node. In some cases, a UE may perform a handover procedure to select a new master node and secondary node (target nodes). Wireless communications systems may support different types of handover procedures. In some examples, handover is triggered by the network. According to at least one handover procedure (e.g., a conditional handover procedure), the UE selects a target master node and one or more target secondary nodes (for dual-connectivity communications) based on satisfaction of one or more conditions evaluated at the UE.

Data forwarding is used to communicate data between nodes of a network to support communications with a UE during a handover procedure. For example, during the handover procedure, network data is being communicated from the network to the source network node for communication to the UE. Data forwarding allows that data to be communicated from the source network node to the target network node, and then relayed to the UE. Data can be forwarded directly (from the source network node to the target network node) via direct data forwarding or indirectly (between multiple nodes) via indirect data forwarding. Direct data forwarding results in improved latency and reliability and reduced complexity. Currently, there is no technique to support direct data forwarding between a source secondary node and a target master node or a target secondary node, if a direct data forwarding path is available between such nodes.

Techniques described herein support configuration of a direct data forwarding path during a conditional handover procedure to allow a source secondary node to communicate directly with a target master node or a target secondary node. In response to a handover request from a source master node, the target master node may communicate with associated candidate secondary nodes (target secondary nodes) to determine whether the secondary nodes have direct data communication paths available for the source secondary node. If paths are available, the addresses for the target secondary nodes are communicated to the source master node, which may relay the addresses to the source secondary nodes, if applicable. The source secondary node may then directly forward data received from the network for the UE to the target master node and/or the target secondary node, based on the direct data forwarding path availability. The signaling used to communicate direct data forwarding availability and corresponding addresses may include signaling used as part of the conditional handover procedure, such as a secondary node addition request, a secondary node addition request acknowledge, a handover request acknowledge, and an Xn-U address indication. These and other techniques are described in further detail with respect to the figures.

Aspects of the disclosure are initially described in the context of wireless communications systems. Aspects of the disclosure are further described with respect to a wireless communications system illustrating UE mobility and a handover procedure and with respect to a process flow diagram. Aspects of the disclosure are further illustrated by and described with reference to apparatus diagrams, system diagrams, and flowcharts that relate to direct data forwarding for user equipment handover.

FIG. 1 illustrates an example of a wireless communications system 100 that supports direct data forwarding for user equipment handover in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support direct data forwarding for user equipment handover as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_S=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

As described herein, the wireless communications system may support the UEs 115 communicating with the network in dual connectivity scenarios, such that the UEs 115 may communicate with two or more network entities 105. In some examples, a UE 115 may communicate with a master node (e.g., a first network entity 105) and one or more secondary nodes (e.g., a second network entity 105). Additionally, as UEs 115 may be mobile, a UE 115 may switch from communications with a first network entity 105 to communications with another network entity, which may be referred to as a handover procedure. The wireless communications system 100 may support multiple different types of handover procedures, and the handover may be triggered based on one or more instructions transmitted by a network entity 105. In some cases, such as when the UE 115 is operating in accordance with a dual connectivity scenario, the UE 115 may evaluate a set of conditions and trigger new master node and secondary node selection based on the condition evaluation. This type of handover may be referred to as a conditional handover.

The wireless communications system 100 may also support data forwarding, whereby data intended for a UE 115 is communicated between nodes (e.g., network entities 105) before, during, or after a handover procedure for the UE 115. For example, during the handover procedure, network data is being communicated from the network to the source network node (e.g., a first network entity 105) for communication to the UE 115. Data forwarding allows that data to be communicated from the source network node (e.g., the first network entity 105) to the target network node (e.g., a second network entity 105), and then relayed to the UE 115. Data can be forwarded directly (from the source network node to the target network node) via direct data forwarding or indirectly (between multiple nodes) via indirect data forwarding. Direct data forwarding results in improved latency, reliability, and performance and reduced complexity for network nodes. However, in some cases, network nodes may not be configured to determine direct data forwarding path availability during a handover procedure (e.g., conditional handover) for a UE 115.

As used herein, the term "source," when discussing a network node or network entity, refers to the network entity with which the UE is communicating before the handover is triggered. Additionally, the term "target" refers to the network entity 105 with which the UE 115 may be connecting or communicating with after the handover procedure is triggered. In some examples, the target network nodes are candidate nodes which the UE 115 may select for handover based on the condition evaluations, as described herein.

Techniques described herein support identification and utilization of a direct data forwarding path between source master and secondary nodes and target master and secondary nodes to support handover of a UE 115. For example, after receiving a handover request from a source master node, a target master node may communicate with one or more target secondary nodes to determine whether the target secondary nodes have direct data forwarding paths with the source master node and the source secondary nodes. If the target master node determines that the direct data forwarding paths are available, then the target master node communicates indications of addresses for the source secondary nodes to the source master node. The source master node may then communicate the address information to the source secondary node, if applicable. After receiving the address information, the source secondary node may transmit data intended for the UE 115 (e.g., one or more data packets) to target master node or the target secondary node for communication to the UE 115.

Figure 2:
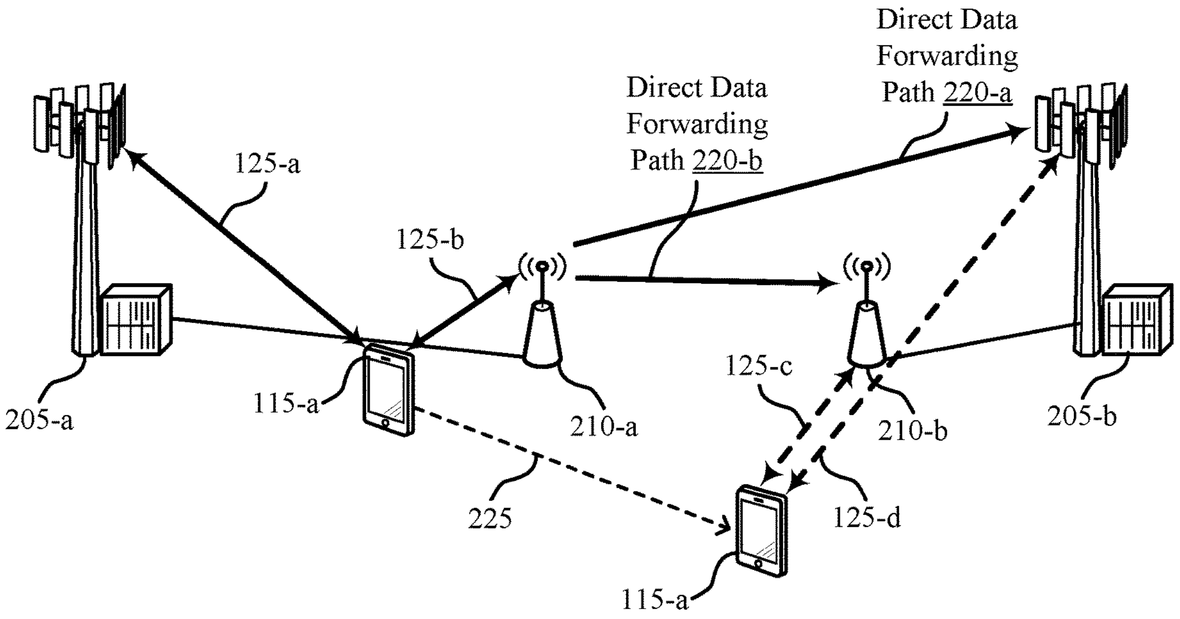
FIG. 2 illustrates an example of a wireless communications system that supports direct data forwarding for user equipment handover in accordance with one or more aspects of the present disclosure.

FIG. 2 illustrates an example of a wireless communications system 200 that supports direct data forwarding for user equipment handover in accordance with one or more aspects of the present disclosure. The wireless communications system 200 includes master nodes 205, secondary nodes 210, and a UE 115-*a*. The master nodes 205 and the secondary nodes 210 may be examples of network entities 105 as described with respect to FIG. 1, and the UE 115-*a* may be an example the UEs 115 as described with respect to FIG. 1. The UE 115-*a* may communicate with the master node 205-*a* via the communication link 125-*a* and with the secondary node 210-*a* via the communication link 125-*b*.

As described herein, the UE 115-*a* may be mobile and, as such, may communicate with different network entities 105. For example, the UE 115-*a* may travel along path 225 and may establish communication links 125-*c* and 125-*d* with the master node 205-*b* and the secondary node 210-*b* in response to a handover procedure. For example, the UE 115-*a* may transmit period or aperiodic measurement reports to the master node 205-*a*, and the master node 205-*a* may initiate the handover procedure for the UE 115-*a* based on the measurement report by communicating with the master node 205-*b*. In some cases, such as in a conditional handover (CHO) procedure, the UE 115-*a* may be configured with a set of target candidate cells, and the UE 115-*a* may select among the target candidate cells based on the measurements by the UE 115-*a*. Thus, as illustrated in FIG. 2, the UE 115-*a* selects the master node 205-*b* and the secondary node 210-*b* and establishes respective connections (e.g., communication links 125-*c* and 125-*d*) with the master node 205-*b* and the secondary node 210-*b*.

To support improved reliability, efficiency, and latency and reduced complexity, the wireless communications system 200 may support configuration of direct data forwarding for a handover of the UE 115-*a*. For example, in response to receiving a handover request from the master node 205-*a*, the master node 205-*b* may determine whether the secondary node 210-*b* has a direct data forwarding path availability for the secondary node 210-*a* by transmitting an identifier corresponding to the secondary node 210-*a* or an identifier for the master node 205-*a* to the secondary node 210-*b*. In response, the secondary node 210-*b* may transmit an indication of availability of one or both direct data forwarding paths to the master node 205-*a* and to the secondary node 210-*a*, respectively, and a corresponding addresses for the secondary node 210-*b*.

The master node 205-*b* may transmit indications of direct data forwarding availability to the master node 205-*a*. In some cases, the master node 205-*b* indicates whether the secondary node 210-*b* has direct data forwarding path availability with the secondary node 210-*a*. Additionally, the master node 205-*b* may indicate whether the master node 205-*b* has a direct forwarding path available for the secondary node 210-*a*. If one or more paths are available, the master node 205-*b* may also transmit indications of corresponding addresses to use for direct data forwarding. In some examples, the communications to determine direct data forwarding availability and to indicate the addresses for corresponding direct data forwarding paths may include signaling used for the handover procedure (e.g., as described with respect to FIG. 3A and FIG. 3B).

As illustrated in FIG. 2, the UE 115-*a* may establish the communication link 125-*c* with the secondary node 210-*b* and the communication link 125-*d* with the master node 205-*b*. Network data intended for the UE 115-*a* that is communicated to the secondary node 210-*a* during or after the handover procedure is transmitted to the secondary node

210-*b* via direct data forwarding path 220-*b* and/or to the master node 205-*b* via the direct data forwarding path 220-*a*.

Figure 3A:
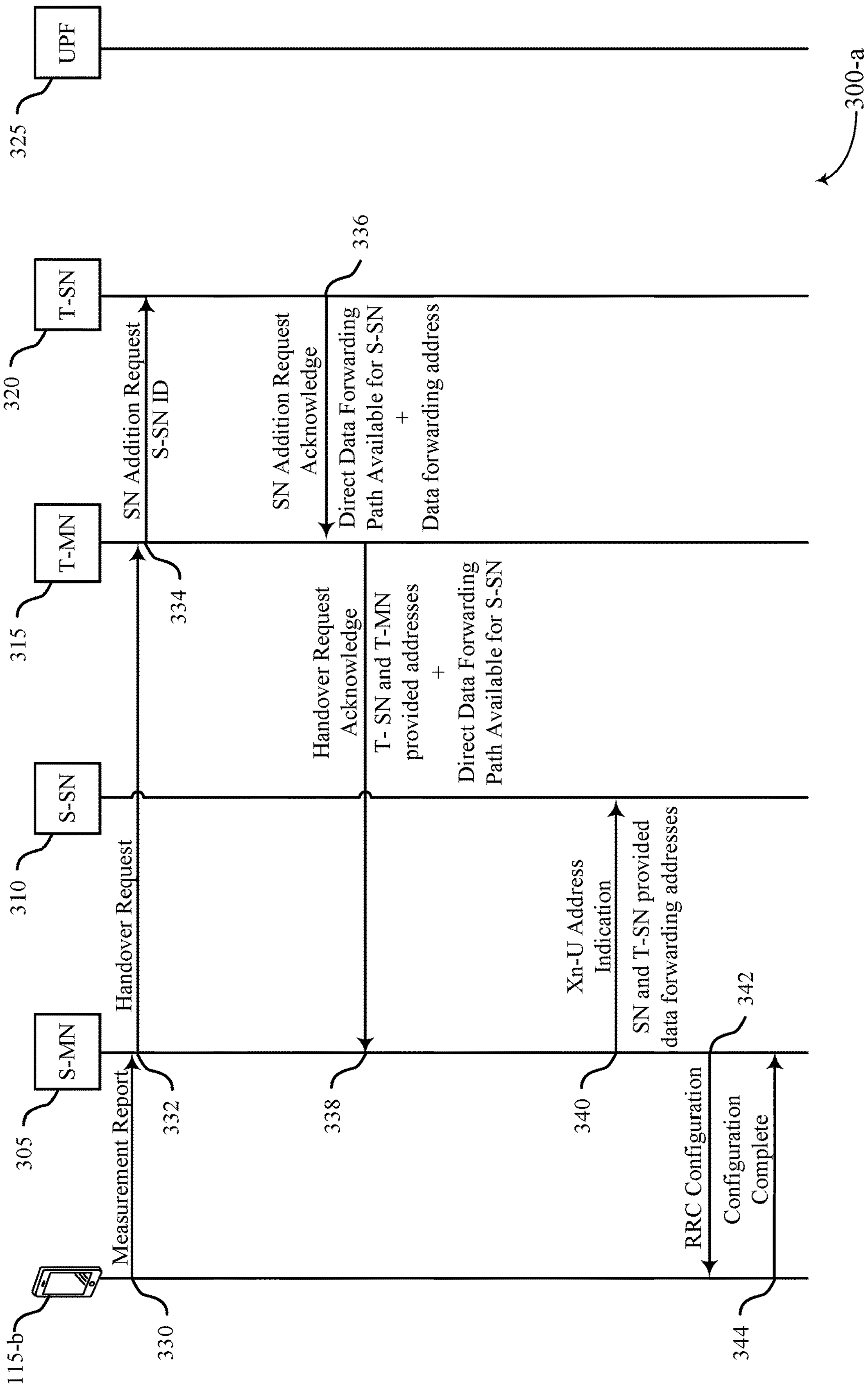
FIG. 3A and FIG. 3B illustrate an example of a process flow that supports direct data forwarding for user equipment handover in accordance with one or more aspects of the present disclosure.
Figure 3B:
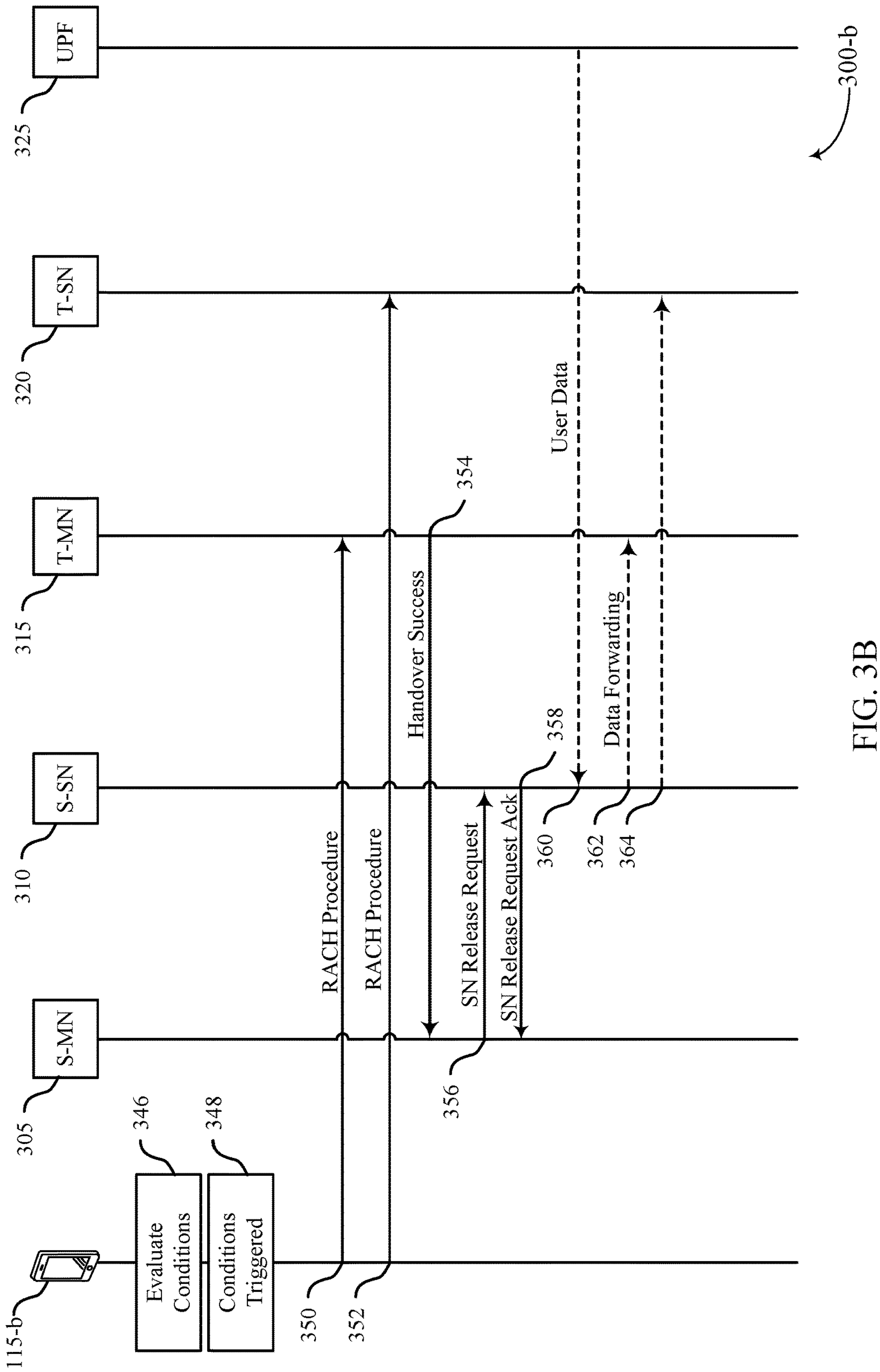

FIG. 3A and FIG. 3B illustrate an example of a process flow 300 that supports direct data forwarding for user equipment handover in accordance with one or more aspects of the present disclosure. The process flow 300-*a* and 300-*b* includes a UE 115-*b*, a source master node (S-MN) 305, a source secondary node (S-SN) 310, a target master node (T-MN) 315, a target secondary node (T-SN) 320, and a user plane function (UPF) 325. The UE 115-*b* may be an example of the UEs 115 as described with respect to FIGS. 1 and 2. The source master node 305 may be an example of the master node 205-*a*, the source secondary node 310 may be an example of the secondary node 210-*a*, the target master node may be an example of the master node 205-*b*, and the target secondary node 320 may be an example of the secondary node 210-*b*, as described with respect to FIG. 2.

The process flow 300 includes aspects of a conditional handover procedure with multiple candidate secondary cell groups (SCGs). In this procedure, the UE 115-*a* may be configured with a set of candidate target primary secondary cells (PSCells), so that after the UE selects a primary cell (PCell) (e.g., the target master node 315) after a conditional handover trigger, the UE 115-*a* may select among the target PSCells (e.g., selects target secondary node 320) based on the measurements. This technique may support the UE 115-*b* resuming dual-connectivity communications efficiently after handover.

At 330, the UE 115-*a* may transmit a measurement report to the source master node 305. The measurement report may be transmitted based on a scheduled basis or may be transmitted in response to an event (e.g., a threshold measurement is satisfied). Based on the measurement report, the source master node 305 may initiate conditional handover preparation with multiple target master nodes, such as the target master node 315 (one target master node is shown in FIG. 3A and FIG. 3B for simplicity). To initiate conditional handover preparation, the source master node 305 may transmit, at 332, a handover request to one or target master nodes (PCells) including the target master node 315. The handover request may include an identifier for the source secondary node 310. Each target master node may initiate a conditional PSCell addition (CPA) or conditional PSCell change (CPC) procedure with target secondary nodes to prepare a set of candidate target PSCells. To perform the CPA or the CPS procedure, the target master node 315 may transmit, at 334, a message (e.g., a secondary node addition request) to multiple target secondary nodes, such as target secondary node 320. The message may be transmitted in response to the handover request. To support direct data forwarding, as described herein, the secondary node addition request at 334 may include an identifier for the source secondary node 310. Inclusion of the identifier for the source secondary node 310 may allow the target secondary nodes (including target secondary node 320) to determine whether they have direct data forwarding availability to the source secondary node 310. Thus, the target master node 315 inquires, with one or more target secondary nodes, about direct forwarding path availability to the source secondary node 310 by including, in the secondary node addition request, the source secondary node identifier.

At 336, in response to the secondary node addition request, the target secondary node 320 may transmit a message (e.g., a secondary node addition request acknowledge message). To support direct data forwarding, the secondary node addition request acknowledge message at 335 may include an indication of direct forwarding path availability to the source secondary node 310. If there are direct forwarding paths available to the source secondary node 310, the target secondary node 320 may include one or more indications of the addresses to be used for direct data forwarding in the secondary node addition request acknowledge message. Thus, as illustrated at 336, the secondary node addition request acknowledge message includes an indication that direct data forwarding is available (e.g., a bit flag) and an indication of a data forwarding address to be used for direct data forwarding from the source secondary node 310 to the target secondary node 320.

At 338, the target master node 315 may transmit, to the source master node 305, a handover request acknowledge message. The handover request acknowledge message may include address information indicative of at least one direct data forwarding address for direct data forwarding from the source secondary node 310 or from the source master node 305 in association with a handover of the UE 115-*b*. For example, if the direct forwarding path availability indication is included for the source secondary node 310 (as received from the target secondary node 320 in the secondary node addition request acknowledge message), the target master node 315 includes the one or more addresses provided by the target secondary node 320 in the handover request acknowledge message for one or more radio bearers that are terminated by source secondary node 310 and moved from the source secondary node 310 to the target secondary node 320. In this case, the target master node 315 may also include a direct forwarding path availability indication from the target secondary node 320 to the source secondary node 310 along with the one or more addresses provided by the target secondary node 320 in the handover request acknowledge message.

If, however, the target secondary node 320 does not indicate that a direct data forwarding path is available from the source master node 305 to the target secondary node 320, then the target master node 315 may include its own address in the handover request acknowledge message (at 338) for indirect data forwarding. Further, if target secondary node 320 does not indicate that a direct data forwarding path is available from the source secondary node 310 to the target secondary node 320, then the target master node 315 may include its own address in the handover request acknowledge message for indirect data forwarding.

After receiving the indication of direct data forwarding availability in the handover request acknowledge message, the source master node 305 may forward the data forwarding addresses provided by the target secondary node 320 to the source secondary node 310 in a message. For example, these addresses may be provided in an Xn-U address indication (e.g., an address indication message) at 340. Thus, in the Xn-U address indication message, the source master node 305 includes the addresses provided by the target secondary node 320 that are included in the handover request acknowledge message, if the direct forwarding path availability indication is also present. The addresses included in the address indication message may be referred to as "data forwarding information" or "direct data forwarding information."

If, however, the indication of direct data forwarding path availability for the source secondary node 310 to the target secondary node 320 is not included in the handover request acknowledge message, then the source master node 305 may include its own address in the Xn-U address indication message at 350. Additionally, if the handover request acknowledge message does not indicate that a direct data forwarding path is available from the source secondary node 310 to the target master node 315, then the source master node 305 may indicate the source master node's own address in the Xn-U address indication message.

At 342, as part of the handover procedure (e.g., CHO procedure), the source master node 305 may use radio resource control (RRC) signaling to configure the UE 115-*b* with a set conditions for the CHO. For example, the RRC signaling may be used to configure the UE 115-*b* with a set of target candidate target primary cells (e.g., including the target master node 315) and a set of candidate target PSCells (e.g., including the target secondary node 320). At 344, the UE 115-*b* may transmit, to the source master node 305, an RRC configuration complete message to acknowledge the RRC configuration.

Turning to process flow 300-*b* of FIG. 3B, at 346, the UE 115-*b* may evaluate the conditions included in the RRC configuration. At 348, the execution conditions are triggered for a candidate PCell (e.g., target master node 315) and a candidate PSCell (e.g., the target secondary node 320). For example, measurements associated with the target master node 315 and/or the target secondary node 320 may satisfy a measurement threshold.

At 350, in response to triggering the execution conditions, the UE 115-*b* may perform a random access (RACH) procedure with the target master node 315 (e.g., the PCell) to establish a communication link with the target master node 315. At 352, the UE 115-*b* may perform a RACH procedure with the target secondary node 320 (e.g., the PSCell) to establish a communication link with the target secondary node 320. At 354, the target master node 315 may, in response to the RACH procedure, transmit, to the source master node 305, a message indicating that the handover of the UE 115-*b* was successful. At 356, the source master node 305 may transmit, to the source secondary node 310, a secondary node release request for the UE 115-*b*. At 358, the source secondary node 310 may transmit, to the source master node 305, a secondary node release request acknowledge message.

At 360, the source secondary node 310 may receive one or more data packets to be transmitted to the UE 115-*b*. At 362, the source secondary node 310 may transmit, to the target master node 315, the at least one data packet via direct data forwarding. For example, the at least one data packet may be transmitted using the address provided in the address indication message received from the source master node 305. At 364, the source secondary node 310 may transmit, to the target secondary node 320, the at last one data packet via direct data forwarding. For example, the at least one data packet may be transmitted using the address provided in the address indication message received from the source master node 305.

Thus, using the techniques described herein, direct data forwarding may be performed for: (1) a secondary node terminated bearer moved from a source secondary node to a target secondary node; (2) a master node terminated bearer moved from the source master node to a target secondary node; and/or (3) a secondary node terminated bearer moved from the source secondary node to a target master node. For direct data forwarding for a secondary node terminated bearer moved from the source secondary node to a target master node, the target master node includes the target master node addresses in the handover request acknowledge message. Further, the source master node may determine, from the source secondary node using the secondary node modification procedure, whether the source secondary node has a direct forwarding path available to the target master node. Before initiating the conditional handover procedure, the source master node may perform a secondary node modification procedure and obtain this information from the source secondary node. Consequently, a direct forwarding path availability indication may not be required in the handover request acknowledge message in this case. As described with respect to FIG. 3A and FIG. 3B, after receiving the handover request acknowledge message, if there are data forwarding addresses included for a secondary node terminated bearer moved from the source secondary node to the target master node, the source maser node forwards such addresses to the source master node.

Figure 4:
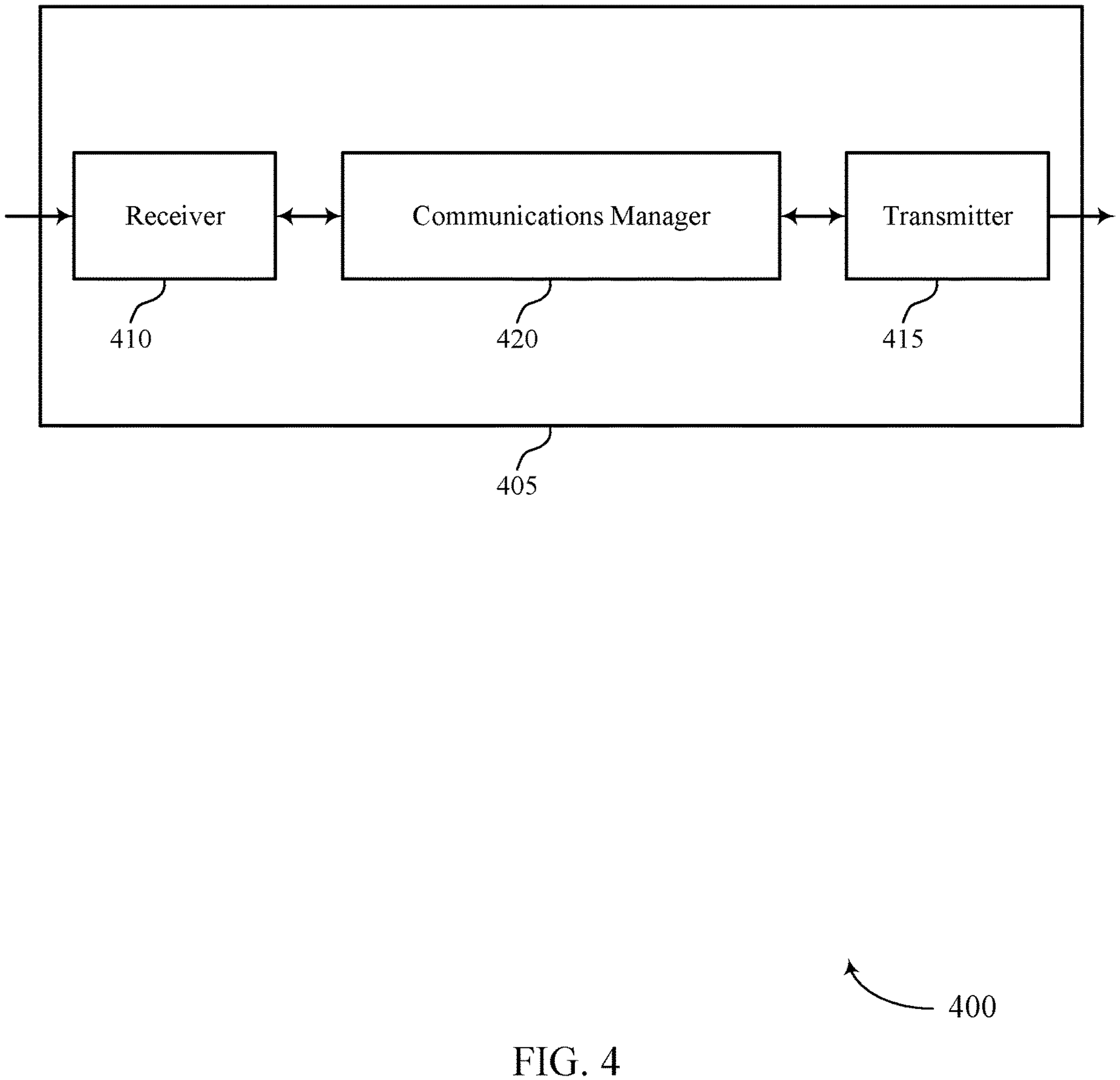
FIGS. 4 and 5 illustrate block diagrams of devices that support direct data forwarding for user equipment handover in accordance with one or more aspects of the present disclosure.

FIG. 4 illustrates a block diagram 400 of a device 405 that supports direct data forwarding for user equipment handover in accordance with one or more aspects of the present disclosure. The device 405 may be an example of aspects of a network entity 105 as described herein. The device 405 may include a receiver 410, a transmitter 415, and a communications manager 420. The device 405 may also include a processor. Each of these components may be in communication with one another (e.g., via one or more buses).

The receiver 410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 405. In some examples, the receiver 410 may support obtaining information by receiving signals via one or more antennas. Additionally, or alternatively, the receiver 410 may support obtaining information by receiving signals via one or more wired (e.g., electrical, fiber optic) interfaces, wireless interfaces, or any combination thereof.

The transmitter 415 may provide a means for outputting (e.g., transmitting, providing, conveying, sending) information generated by other components of the device 405. For example, the transmitter 415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 415 may support outputting information by transmitting signals via one or more antennas. Additionally, or alternatively, the transmitter 415 may support outputting information by transmitting signals via one or more wired (e.g., electrical, fiber optic) interfaces, wireless interfaces, or any combination thereof. In some examples, the transmitter 415 and the receiver 410 may be co-located in a transceiver, which may include or be coupled with a modem.

The communications manager 420, the receiver 410, the transmitter 415, or various combinations thereof or various components thereof may be examples of means for performing various aspects of direct data forwarding for user equipment handover as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communication at a target master node in accordance with examples as disclosed herein. For example, the communications manager 420 may be configured as or otherwise support a means for receiving, from a source master node, a handover request that corresponds to a UE. The communications manager 420 may be configured as or otherwise support a means for transmitting, responsive to the handover request and to a target secondary node associated with the target master node in a dual connectivity system, via a first message, a secondary node identifier for a source secondary node associated with the source master node in the dual connectivity system. The communications manager 420 may be configured as or otherwise support a means for receiving via a second message responsive to the first message, information indicative of whether a direct data forwarding path is available between the target secondary node and the source secondary node. The communications manager 420 may be configured as or otherwise support a means for transmitting, to the source master node and in response to the second message, address information indicative of at least one direct data forwarding address for direct data forwarding from the source secondary node in association with a handover of the UE Additionally, or alternatively, the communications manager 420 may support wireless communication at a source master node in accordance with examples as disclosed herein. For example, the communications manager 420 may be configured as or otherwise support a means for transmitting, to a target master node, a handover request that corresponds to a UE. The communications manager 420 may be configured as or otherwise support a means for receiving, from the target master node and in response to the handover request, address information that is indicative of at least one direct data forwarding address for direct data forwarding to at least one of the target master node or a target secondary node in a dual connectivity system, the direct data forwarding associated with a handover of the UE. The communications manager 420 may be configured as or otherwise support a means for transmitting, to a source secondary node associated with the source master node and via a first message, direct data forwarding information indicative of the at least one direct data forwarding address for direct data forwarding, for the UE, to the at least one of the target master node or the target secondary node in the dual connectivity system.

Additionally, or alternatively, the communications manager 420 may support wireless communication at a source secondary node in accordance with examples as disclosed herein. For example, the communications manager 420 may be configured as or otherwise support a means for receiving, from a source master node, address information indicative of at least one direct data forwarding address for direct data forwarding, for a UE, to at least one of a target master node or a target secondary node in a dual connectivity system, the direct data forwarding associated with a handover of the UE. The communications manager 420 may be configured as or otherwise support a means for receiving at least one data packet to be transmitted to the UE. The communications manager 420 may be configured as or otherwise support a means for transmitting, to the target master node or the target secondary node associated with the address information, the at least one data packet via direct data forwarding.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for direct data forwarding, whenever possible, between various nodes in the network. Direct data forwarding provides enhanced data forwarding performance during handover in terms of overall latency and processing complexity at the network nodes, compared to indirect data forwarding.

Figure 5:
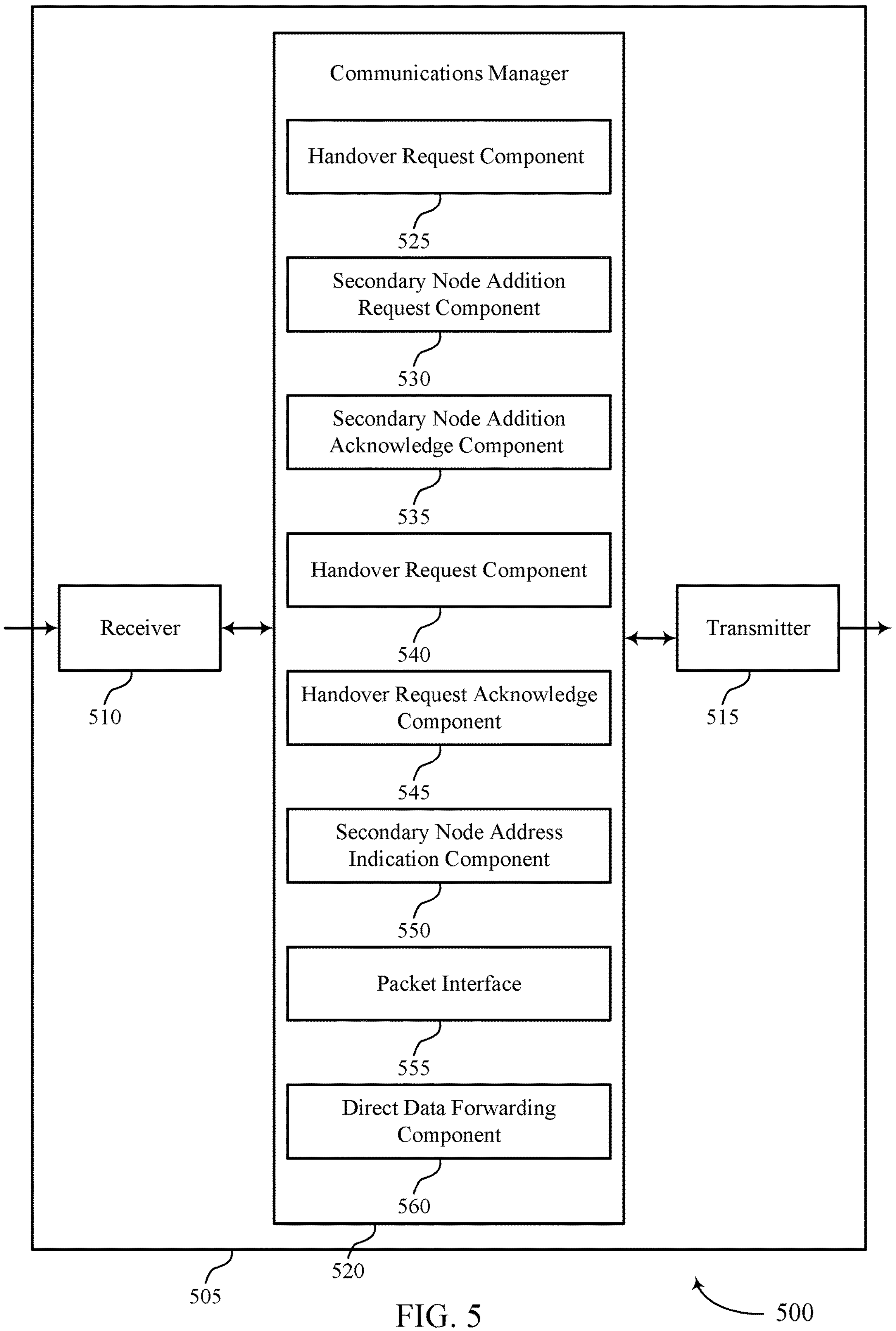

FIG. 5 illustrates a block diagram 500 of a device 505 that supports direct data forwarding for user equipment handover in accordance with one or more aspects of the present disclosure. The device 505 may be an example of aspects of a device 405 or a network entity 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 505. In some examples, the receiver 510 may support obtaining information by receiving signals via one or more antennas. Additionally, or alternatively, the receiver 510 may support obtaining information by receiving signals via one or more wired (e.g., electrical, fiber optic) interfaces, wireless interfaces, or any combination thereof.

The transmitter 515 may provide a means for outputting (e.g., transmitting, providing, conveying, sending) information generated by other components of the device 505. For example, the transmitter 515 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 515 may support outputting information by transmitting signals via one or more antennas. Additionally, or alternatively, the transmitter 515 may support outputting information by transmitting signals via one or more wired (e.g., electrical, fiber optic) interfaces, wireless interfaces, or any combination thereof. In some examples, the transmitter 515 and the receiver 510 may be co-located in a transceiver, which may include or be coupled with a modem.

The device 505, or various components thereof, may be an example of means for performing various aspects of direct data forwarding for user equipment handover as described herein. For example, the communications manager 520 may include a handover request component 525, a secondary node addition request component 530, a secondary node addition acknowledge component 535, a handover request component 540, a handover request acknowledge component 545, a secondary node address indication component 550, a packet interface 555, a direct data forwarding component 560, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a target master node in accordance with examples as disclosed herein. The handover request component 525 may be configured as or otherwise support a means for receiving, from a source master node, a handover request that corresponds to a UE. The secondary node addition request component 530 may be configured as or otherwise support a means for transmitting, responsive to the handover request and to a target secondary node associated with the target master node in a dual connectivity system, via a first message, a secondary node identifier for a source secondary node associated with the source master node in the dual connectivity system. The secondary node addition acknowledge component 535 may be configured as or otherwise support a means for receiving via a second message responsive to the first message, information indicative of whether a direct data forwarding path is available between the target secondary node and the source secondary node. The handover request acknowledge component 545 may be configured as or otherwise support a means for transmitting, to the source master node and in response to the second message, address information indicative of at least one direct data forwarding address for direct data forwarding from the source secondary node in association with a handover of the UE.

Additionally, or alternatively, the communications manager 520 may support wireless communication at a source master node in accordance with examples as disclosed herein. The handover request component 540 may be configured as or otherwise support a means for transmitting, to a target master node, a handover request that corresponds to a UE. The handover request acknowledge component 545 may be configured as or otherwise support a means for receiving, from the target master node and in response to the handover request, address information that is indicative of at least one direct data forwarding address for direct data forwarding to at least one of the target master node or a target secondary node in a dual connectivity system, the direct data forwarding associated with a handover of the UE. The secondary node address indication component 550 may be configured as or otherwise support a means for transmitting, to a source secondary node associated with the source master node and via a first message, direct data forwarding information indicative of the at least one direct data forwarding address for direct data forwarding, for the UE, to the at least one of the target master node or the target secondary node in the dual connectivity system.

Additionally, or alternatively, the communications manager 520 may support wireless communication at a source secondary node in accordance with examples as disclosed herein. The secondary node address indication component 550 may be configured as or otherwise support a means for receiving, from a source master node, address information indicative of at least one direct data forwarding address for direct data forwarding, for a UE, to at least one of a target master node or a target secondary node in a dual connectivity system, the direct data forwarding associated with a handover of the UE. The packet interface 555 may be configured as or otherwise support a means for receiving at least one data packet to be transmitted to the UE. The direct data forwarding component 560 may be configured as or otherwise support a means for transmitting, to the target master node or the target secondary node associated with the address information, the at least one data packet via direct data forwarding.

Figure 6:
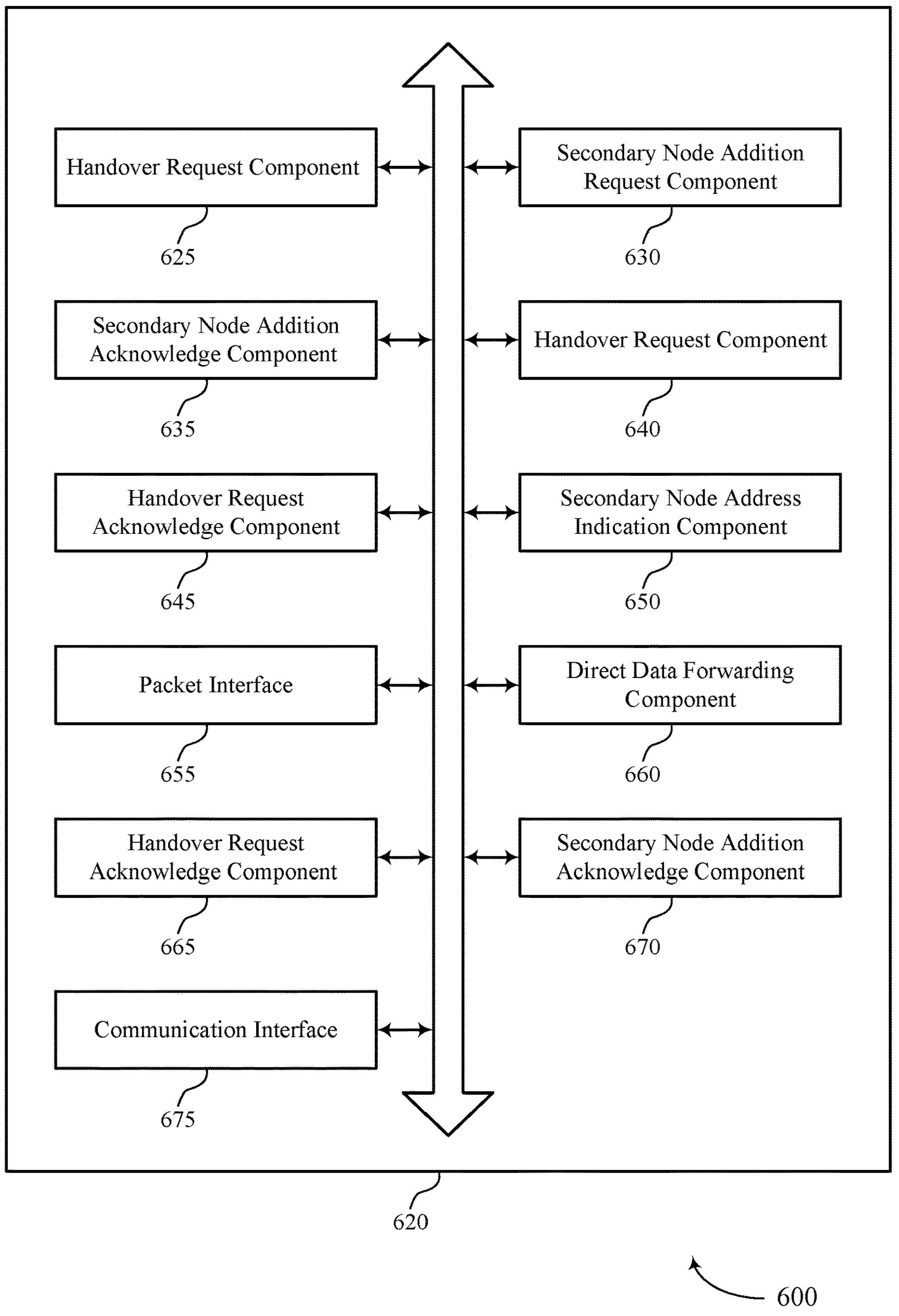
FIG. 6 illustrates a block diagram of a communications manager that supports direct data forwarding for user equipment handover in accordance with one or more aspects of the present disclosure.

FIG. 6 illustrates a block diagram 600 of a communications manager 620 that supports direct data forwarding for user equipment handover in accordance with one or more aspects of the present disclosure. The communications manager 620 may be an example of aspects of a communications manager 420, a communications manager 520, or both, as described herein. The communications manager 620, or various components thereof, may be an example of means for performing various aspects of direct data forwarding for user equipment handover as described herein. For example, the communications manager 620 may include a handover request component 625, a secondary node addition request component 630, a secondary node addition acknowledge component 635, a handover request component 640, a handover request acknowledge component 645, a secondary node address indication component 650, a packet interface 655, a direct data forwarding component 660, a handover request acknowledge component 665, a secondary node addition acknowledge component 670, a communication interface 675, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 620 may support wireless communication at a target master node in accordance with examples as disclosed herein. The handover request component 625 may be configured as or otherwise support a means for receiving, from a source master node, a handover request that corresponds to a UE. The secondary node addition request component 630 may be configured as or otherwise support a means for transmitting, responsive to the handover request and to a target secondary node associated with the target master node in a dual connectivity system, via a first message, a secondary node identifier for a source secondary node associated with the source master node in the dual connectivity system. The secondary node addition acknowledge component 635 may be configured as or otherwise support a means for receiving via a second message responsive to the first message, information indicative of whether a direct data forwarding path is available between the target secondary node and the source secondary node.

In some examples, the handover request acknowledge component 665 may be configured as or otherwise support a means for transmitting, to the source master node and in response to the second message, address information indicative of at least one direct data forwarding address for direct data forwarding from the source secondary node in association with a handover of the UE.

In some examples, to support transmitting the address information, the handover request acknowledge component 645 may be configured as or otherwise support a means for transmitting a first address for direct data forwarding from the source secondary node to the target master node, a second address for direct data forwarding from the source secondary node to the target secondary node, or both the first address and the second address.

In some examples, to support transmitting the address information, the handover request acknowledge component 645 may be configured as or otherwise support a means for transmitting an indication that direct data forwarding is available from the source secondary node to the target secondary node.

In some examples, to support transmitting the address information, the handover request acknowledge component 645 may be configured as or otherwise support a means for transmitting the address information via a handover request acknowledge message.

In some examples, to support receiving the information indicative of whether the direct data forwarding path is available, the secondary node addition acknowledge component 670 may be configured as or otherwise support a means for receiving, from the target secondary node, an address for direct data forwarding from the source secondary node to the target secondary node for data associated with a data radio bearer between the source secondary node and the UE.

In some examples, to support receiving the information indicative of whether the direct data forwarding path is available, the secondary node addition acknowledge component 670 may be configured as or otherwise support a means for receiving, from the target secondary node, a first address for direct data forwarding from the source secondary node to the target secondary node.

In some examples, to support information indicative of whether the direct data forwarding path is available, the secondary node addition acknowledge component 670 may be configured as or otherwise support a means for receiving the information via a secondary node addition request acknowledge message.

In some examples, the secondary node addition request component 630 may be configured as or otherwise support a means for transmitting the secondary node identifier to a set of multiple target secondary nodes associated with the target master node. In some examples, the secondary node addition acknowledge component 670 may be configured as or otherwise support a means for receiving, from each target secondary node of the set of multiple target secondary nodes, respective information indicative of whether the direct data forwarding path is available.

In some examples, to support transmitting the first message, the secondary node addition request component 630 may be configured as or otherwise support a means for transmitting a secondary node addition request message that indicates the secondary node identifier.

In some examples, the communication interface 675 may be configured as or otherwise support a means for receiving, from the source secondary node in response to transmitting address information, at least one data packet intended for the UE. In some examples, the communication interface 675 may be configured as or otherwise support a means for transmitting the at least one data packet to the UE.

Additionally, or alternatively, the communications manager 620 may support wireless communication at a source master node in accordance with examples as disclosed herein. The handover request component 640 may be configured as or otherwise support a means for transmitting, to a target master node, a handover request that corresponds to a UE. The handover request acknowledge component 645 may be configured as or otherwise support a means for receiving, from the target master node and in response to the handover request, address information that is indicative of at least one direct data forwarding address for direct data forwarding to at least one of the target master node or a target secondary node in a dual connectivity system, the direct data forwarding associated with a handover of the UE. The secondary node address indication component 650 may be configured as or otherwise support a means for transmitting, to a source secondary node associated with the source master node and via a first message, direct data forwarding information indicative of the at least one direct data forwarding address for direct data forwarding, for the UE, to the at least one of the target master node or the target secondary node in the dual connectivity system.

In some examples, to support receiving the address information, the handover request acknowledge component 645 may be configured as or otherwise support a means for receiving, as one of the at least one direct data forwarding address, an address for direct data forwarding from the source secondary node to the target secondary node for data associated with a data radio bearer between the source secondary node and the UE, where the address is transmitted to the source secondary node via the first message.

In some examples, to support receiving the address information, the handover request acknowledge component 645 may be configured as or otherwise support a means for receiving, as one of the at least one direct data forwarding address, an address for direct data forwarding from the source secondary node to the target master node for data associated with a data radio bearer between the source secondary node and the UE, where the address is transmitted to the source secondary node via the first message.

In some examples, to support receiving the address information, the handover request acknowledge component 645 may be configured as or otherwise support a means for receiving the address information via a handover request acknowledge message.

In some examples, to support transmitting the direct data forwarding information, the secondary node address indication component 650 may be configured as or otherwise support a means for transmitting a first address of the at least one direct data forwarding address to the target secondary node, a second address of the at least one direct data forwarding address to the target master node, or both the first address and the second address.

In some examples, to support transmitting the direct data forwarding information, the secondary node address indication component 650 may be configured as or otherwise support a means for transmitting the direct data forwarding information via an address indication message.

In some examples, to support receiving the address information, the handover request acknowledge component 645 may be configured as or otherwise support a means for receiving the address information for direct data forwarding to a set of multiple target secondary nodes.

In some examples, the communication interface 675 may be configured as or otherwise support a means for receiving, from the source secondary node, at least one data packet to be transmitted to the UE. In some examples, the communication interface 675 may be configured as or otherwise support a means for transmitting, to the target secondary node, the at least one data packet for transmission to the UE via indirect data forwarding.

Additionally, or alternatively, the communications manager 620 may support wireless communication at a source secondary node in accordance with examples as disclosed herein. In some examples, the secondary node address indication component 650 may be configured as or otherwise support a means for receiving, from a source master node, address information indicative of at least one direct data forwarding address for direct data forwarding, for a UE, to at least one of a target master node or a target secondary node in a dual connectivity system, the direct data forwarding associated with a handover of the UE. The packet interface 655 may be configured as or otherwise support a means for receiving at least one data packet to be transmitted to the UE. The direct data forwarding component 660 may be configured as or otherwise support a means for transmitting, to the target master node or the target secondary node associated with the address information, the at least one data packet via direct data forwarding.

In some examples, to support receiving the address information, the secondary node address indication component 650 may be configured as or otherwise support a means for receiving the at least one direct data forwarding address for direct data forwarding from the source secondary node to the target secondary node for data associated with a data radio bearer between the source secondary node and the UE, where the at least one data packet is transmitted to the target secondary node in accordance with the address information.

In some examples, receiving the at least one direct data forwarding address for direct data forwarding from the source secondary node to the target master node for data associated with a data radio bearer between the source secondary node and the UE, where the at least one data packet is transmitted to the target master node in accordance with the address information.

Figure 7:
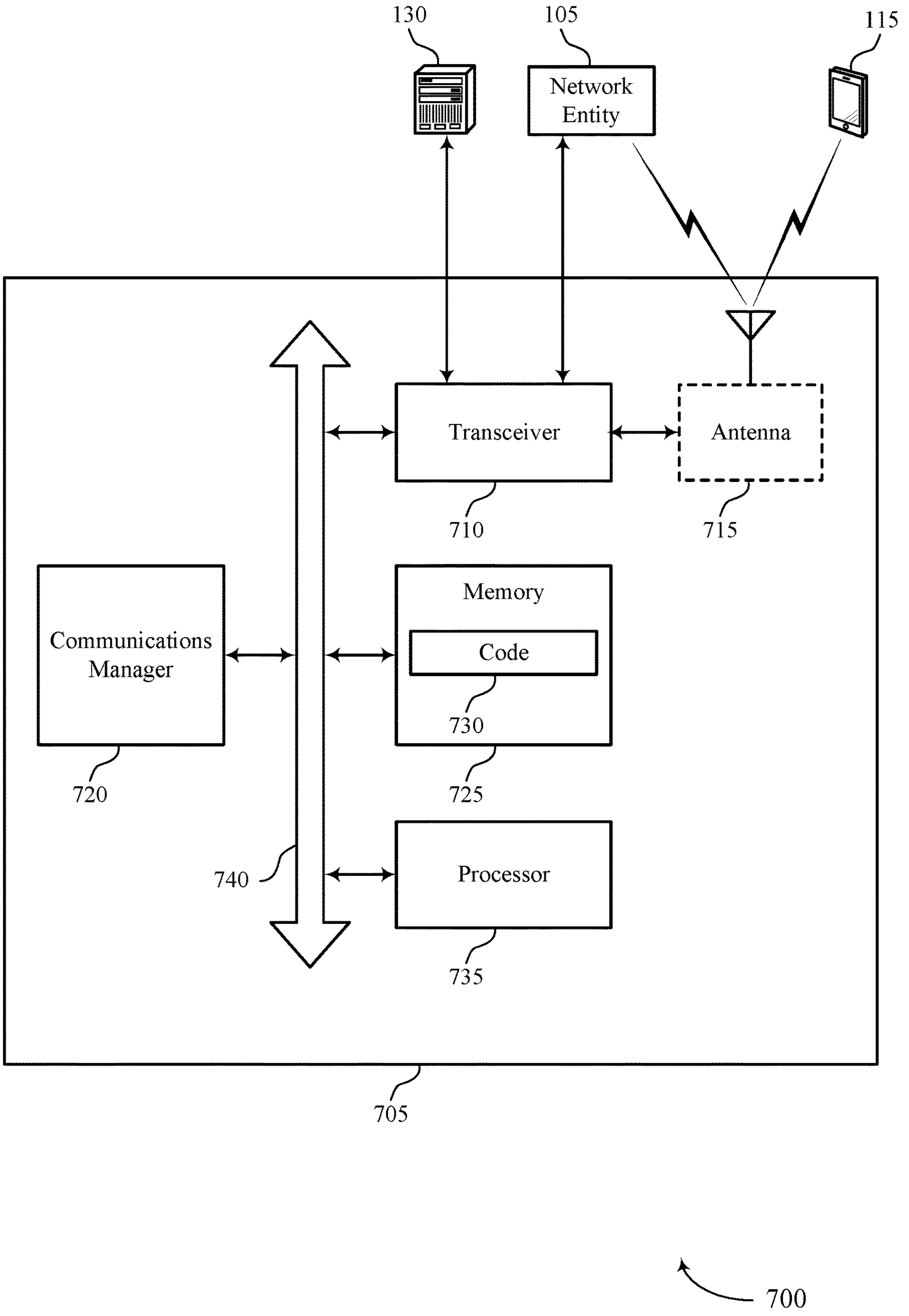
FIG. 7 illustrates a diagram of a system including a device that supports direct data forwarding for user equipment handover in accordance with one or more aspects of the present disclosure.

FIG. 7 illustrates a diagram of a system 700 including a device 705 that supports direct data forwarding for user equipment handover in accordance with one or more aspects of the present disclosure. The device 705 may be an example of or include the components of a device 405, a device 505, or a network entity 105 as described herein. The device 705 may communicate with one or more network entities 105, one or more UEs 115, or any combination thereof, which may include communications over one or more wired interfaces, over one or more wireless interfaces, or any combination thereof. The device 705 may include components that support outputting and obtaining communications, such as a communications manager 720, a transceiver 710, an antenna 715, a memory 725, code 730, and a processor 735. These components may be in electronic communication or otherwise coupled (e.g., operatively, communicatively, functionally, electronically, electrically) via one or more buses (e.g., a bus 740).

The transceiver 710 may support bi-directional communications via wired links, wireless links, or both as described herein. In some examples, the transceiver 710 may include a wired transceiver and may communicate bi-directionally with another wired transceiver. Additionally, or alternatively, in some examples, the transceiver 710 may include a wireless transceiver and may communicate bi-directionally with another wireless transceiver. In some examples, the device 705 may include one or more antennas 715, which may be capable of transmitting or receiving wireless transmissions (e.g., concurrently). The transceiver 710 may also include a modem to modulate signals, to provide the modulated signals for transmission (e.g., by one or more antennas 715, by a wired transmitter), to receive modulated signals (e.g., from one or more antennas 715, from a wired receiver), and to demodulate signals. In some implementations, the transceiver 710 may include one or more interfaces, such as one or more interfaces coupled with the one or more antennas 715 that are configured to support various receiving or obtaining operations, or one or more interfaces coupled with the one or more antennas 715 that are configured to support various transmitting or outputting operations, or a combination thereof. In some implementations, the transceiver 710 may include or be configured for coupling with one or more processors or memory components that are operable to perform or support operations based on received or obtained information or signals, or to generate information or other signals for transmission or other outputting, or any combination thereof. In some implementations, the transceiver 710, or the transceiver 710 and the one or more antennas 715, or the transceiver 710 and the one or more antennas 715 and one or more processors or memory components (for example, the processor 735, or the memory 725, or both), may be included in a chip or chip assembly that is installed in the device 705. In some examples, the transceiver may be operable to support communications via one or more communications links (e.g., a communication link 125, a backhaul communication link 120, a midhaul communication link 162, a fronthaul communication link 168).

The memory 725 may include RAM and ROM. The memory 725 may store computer-readable, computer-executable code 730 including instructions that, when executed by the processor 735, cause the device 705 to perform various functions described herein. The code 730 may be stored in a non-transitory computer-readable medium such as system memory or another type of memory. In some cases, the code 730 may not be directly executable by the processor 735 but may cause a computer (e.g., when compiled and executed) to perform functions described herein. In some cases, the memory 725 may contain, among other things, a BIOS which may control basic hardware or software operation such as the interaction with peripheral components or devices.

The processor 735 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 735 may be configured to operate a memory array using a memory controller. In some other cases, a memory controller may be integrated into the processor 735. The processor 735 may be configured to execute computer-readable instructions stored in a memory (e.g., the memory 725) to cause the device 705 to perform various functions (e.g., functions or tasks supporting direct data forwarding for user equipment handover). For example, the device 705 or a component of the device 705 may include a processor 735 and memory 725 coupled with the processor 735, the processor 735 and memory 725 configured to perform various functions described herein. The processor 735 may be an example of a cloud-computing platform (e.g., one or more physical nodes and supporting software such as operating systems, virtual machines, or container instances) that may host the functions (e.g., by executing code 730) to perform the functions of the device 705. The processor 735 may be any one or more suitable processors capable of executing scripts or instructions of one or more software programs stored in the device 705 (such as within the memory 725). In some implementations, the processor 735 may be a component of a processing system. A processing system may generally refer to a system or series of machines or components that receives inputs and processes the inputs to produce a set of outputs (which may be passed to other systems or components of, for example, the device 705). For example, a processing system of the device 705 may refer to a system including the various other components or subcomponents of the device 705, such as the processor 735, or the transceiver 710, or the communications manager 720, or other components or combinations of components of the device 705. The processing system of the device 705 may interface with other components of the device 705, and may process information received from other components (such as inputs or signals) or output information to other components. For example, a chip or modem of the device 705 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 705 may transmit information output from the chip or modem. Additionally, or alternatively, in some implementations, the one or more interfaces may refer to an interface between the processing system of the chip or modem and a receiver, such that the device 705 may obtain information or signal inputs, and the information may be passed to the processing system. A person having ordinary skill in the art will readily recognize that a first interface also may obtain information or signal inputs, and a second interface also may output information or signal outputs.

In some examples, a bus 740 may support communications of (e.g., within) a protocol layer of a protocol stack. In some examples, a bus 740 may support communications associated with a logical channel of a protocol stack (e.g., between protocol layers of a protocol stack), which may include communications performed within a component of the device 705, or between different components of the device 705 that may be co-located or located in different locations (e.g., where the device 705 may refer to a system in which one or more of the communications manager 720, the transceiver 710, the memory 725, the code 730, and the processor 735 may be located in one of the different components or divided between different components).

In some examples, the communications manager 720 may manage aspects of communications with a core network 130 (e.g., via one or more wired or wireless backhaul links). For example, the communications manager 720 may manage the transfer of data communications for client devices, such as one or more UEs 115. In some examples, the communications manager 720 may manage communications with other network entities 105, and may include a controller or scheduler for controlling communications with UEs 115 in cooperation with other network entities 105. In some examples, the communications manager 720 may support an X2 interface within an LTE/LTE-A wireless communications network technology to provide communication between network entities 105.

The communications manager 720 may support wireless communication at a target master node in accordance with examples as disclosed herein. For example, the communications manager 720 may be configured as or otherwise support a means for receiving, from a source master node, a handover request that corresponds to a UE. The communications manager 720 may be configured as or otherwise support a means for transmitting, responsive to the handover request and to a target secondary node associated with the target master node in a dual connectivity system, via a first message, a secondary node identifier for a source secondary node associated with the source master node in the dual connectivity system. The communications manager 720 may be configured as or otherwise support a means for receiving via a second message responsive to the first message, information indicative of whether a direct data forwarding path is available between the target secondary node and the source secondary node. The communications manager 720 may be configured as or otherwise support a means for transmitting, to the source master node and in response to the second message, address information indicative of at least one direct data forwarding address for direct data forwarding from the source secondary node in association with a handover of the UE.

Additionally, or alternatively, the communications manager 720 may support wireless communication at a source master node in accordance with examples as disclosed herein. For example, the communications manager 720 may be configured as or otherwise support a means for transmitting, to a target master node, a handover request that corresponds to a UE. The communications manager 720 may be configured as or otherwise support a means for receiving, from the target master node and in response to the handover request, address information that is indicative of at least one direct data forwarding address for direct data forwarding to at least one of the target master node or a target secondary node in a dual connectivity system, the direct data forwarding associated with a handover of the UE. The communications manager 720 may be configured as or otherwise support a means for transmitting, to a source secondary node associated with the source master node and via a first message, direct data forwarding information indicative of the at least one direct data forwarding address for direct data forwarding, for the UE, to the at least one of the target master node or the target secondary node in the dual connectivity system.

Additionally, or alternatively, the communications manager 720 may support wireless communication at a source secondary node in accordance with examples as disclosed herein. For example, the communications manager 720 may be configured as or otherwise support a means for receiving, from a source master node, address information indicative of at least one direct data forwarding address for direct data forwarding, for a UE, to at least one of a target master node or a target secondary node in a dual connectivity system, the direct data forwarding associated with a handover of the UE. The communications manager 720 may be configured as or otherwise support a means for receiving at least one data packet to be transmitted to the UE. The communications manager 720 may be configured as or otherwise support a means for transmitting, to the target master node or the target secondary node associated with the address information, the at least one data packet via direct data forwarding.

By including or configuring the communications manager 720 in accordance with examples as described herein, the device 705 may support techniques for direct data forwarding, whenever possible, between various nodes in the network. Direct data forwarding provides enhanced data forwarding performance during handover in terms of overall latency and processing complexity at the network nodes, compared to indirect data forwarding.

In some examples, the communications manager 720 may be configured to perform various operations (e.g., receiving, obtaining, monitoring, outputting, transmitting) using or otherwise in cooperation with the transceiver 710, the one or more antennas 715 (e.g., where applicable), or any combination thereof. Although the communications manager 720 is illustrated as a separate component, in some examples, one or more functions described with reference to the communications manager 720 may be supported by or performed by the transceiver 710, the processor 735, the memory 725, the code 730, or any combination thereof. For example, the code 730 may include instructions executable by the processor 735 to cause the device 705 to perform various aspects of direct data forwarding for user equipment handover as described herein, or the processor 735 and the memory 725 may be otherwise configured to perform or support such operations.

Figure 8:
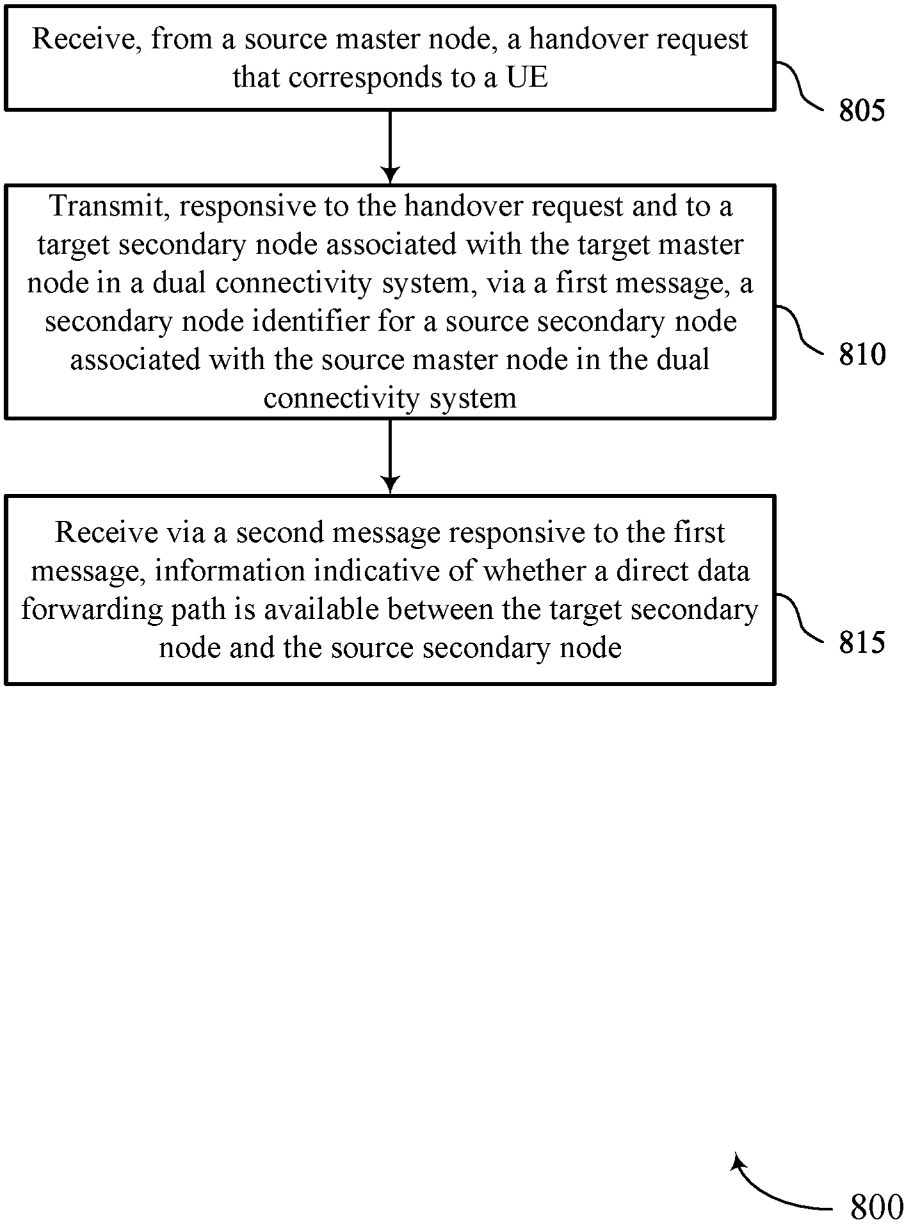
FIGS. 8 through 12 illustrate flowcharts showing methods that support direct data forwarding for user equipment handover in accordance with one or more aspects of the present disclosure.

FIG. 8 illustrates a flowchart showing a method 800 that supports direct data forwarding for user equipment handover in accordance with one or more aspects of the present disclosure. The operations of the method 800 may be implemented by a network entity or its components as described herein. For example, the operations of the method 800 may be performed by a network entity as described with reference to FIGS. 1 through 7. In some examples, a network entity may execute a set of instructions to control the functional elements of the network entity to perform the described functions. Additionally, or alternatively, the network entity may perform aspects of the described functions using special-purpose hardware.

At 805, the method may include receiving, from a source master node, a handover request that corresponds to a UE. The operations of 805 may be performed in accordance with examples as disclosed herein. In some examples, aspects of the operations of 805 may be performed by a handover request component 625 as described with reference to FIG. 6.

At 810, the method may include transmitting, responsive to the handover request and to a target secondary node associated with the target master node in a dual connectivity system, via a first message, a secondary node identifier for a source secondary node associated with the source master node in the dual connectivity system. The operations of 810 may be performed in accordance with examples as disclosed herein. In some examples, aspects of the operations of 810 may be performed by a secondary node addition request component 630 as described with reference to FIG. 6.

At 815, the method may include receiving via a second message responsive to the first message, information indicative of whether a direct data forwarding path is available between the target secondary node and the source secondary node. The operations of 815 may be performed in accordance with examples as disclosed herein. In some examples, aspects of the operations of 815 may be performed by a secondary node addition acknowledge component 635 as described with reference to FIG. 6.

Figure 9:
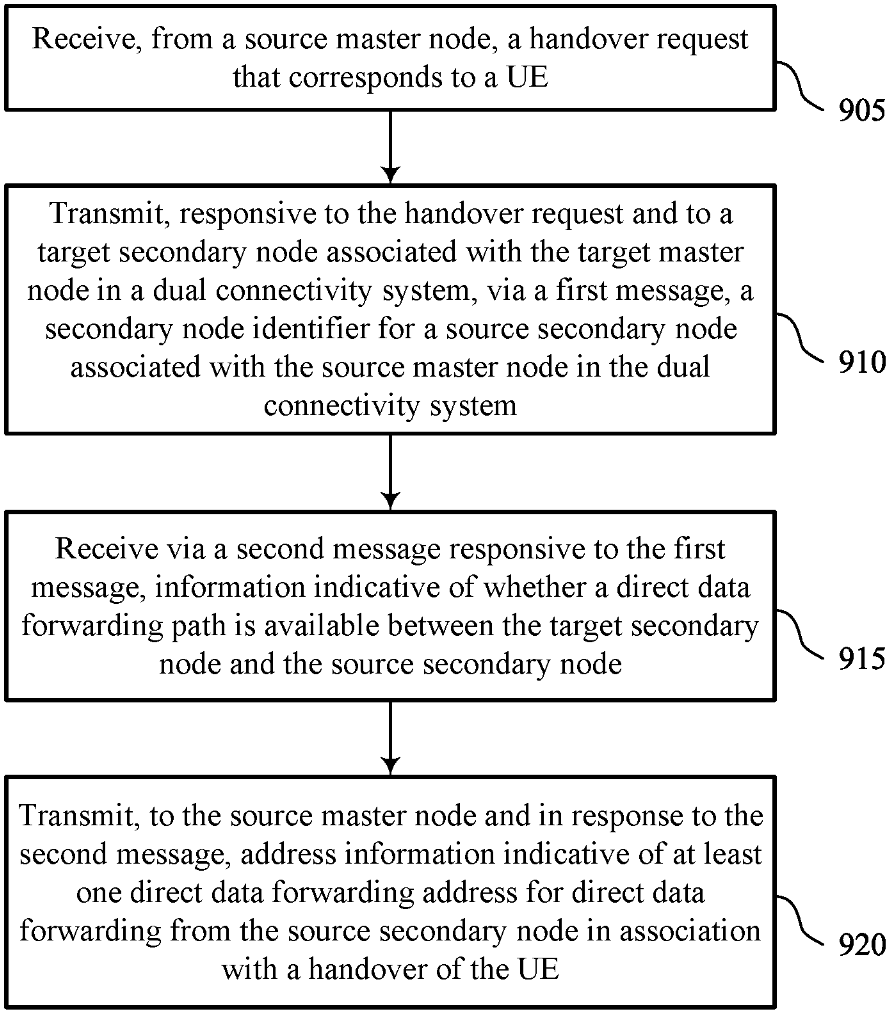

FIG. 9 illustrates a flowchart showing a method 900 that supports direct data forwarding for user equipment handover in accordance with one or more aspects of the present disclosure. The operations of the method 900 may be implemented by a network entity or its components as described herein. For example, the operations of the method 900 may be performed by a network entity as described with reference to FIGS. 1 through 7. In some examples, a network entity may execute a set of instructions to control the functional elements of the network entity to perform the described functions. Additionally, or alternatively, the network entity may perform aspects of the described functions using special-purpose hardware.

At 905, the method may include receiving, from a source master node, a handover request that corresponds to a UE. The operations of 905 may be performed in accordance with examples as disclosed herein. In some examples, aspects of the operations of 905 may be performed by a handover request component 625 as described with reference to FIG. 6.

At 910, the method may include transmitting, responsive to the handover request and to a target secondary node associated with the target master node in a dual connectivity system, via a first message, a secondary node identifier for a source secondary node associated with the source master node in the dual connectivity system. The operations of 910 may be performed in accordance with examples as disclosed herein. In some examples, aspects of the operations of 910 may be performed by a secondary node addition request component 630 as described with reference to FIG. 6.

At 915, the method may include receiving via a second message responsive to the first message, information indicative of whether a direct data forwarding path is available between the target secondary node and the source secondary node. The operations of 915 may be performed in accordance with examples as disclosed herein. In some examples, aspects of the operations of 915 may be performed by a secondary node addition acknowledge component 635 as described with reference to FIG. 6.

At 920, the method may include transmitting, to the source master node and in response to the second message, address information indicative of at least one direct data forwarding address for direct data forwarding from the source secondary node in association with a handover of the UE. The operations of 920 may be performed in accordance with examples as disclosed herein. In some examples, aspects of the operations of 920 may be performed by a handover request acknowledge component 665 as described with reference to FIG. 6.

Figure 10:
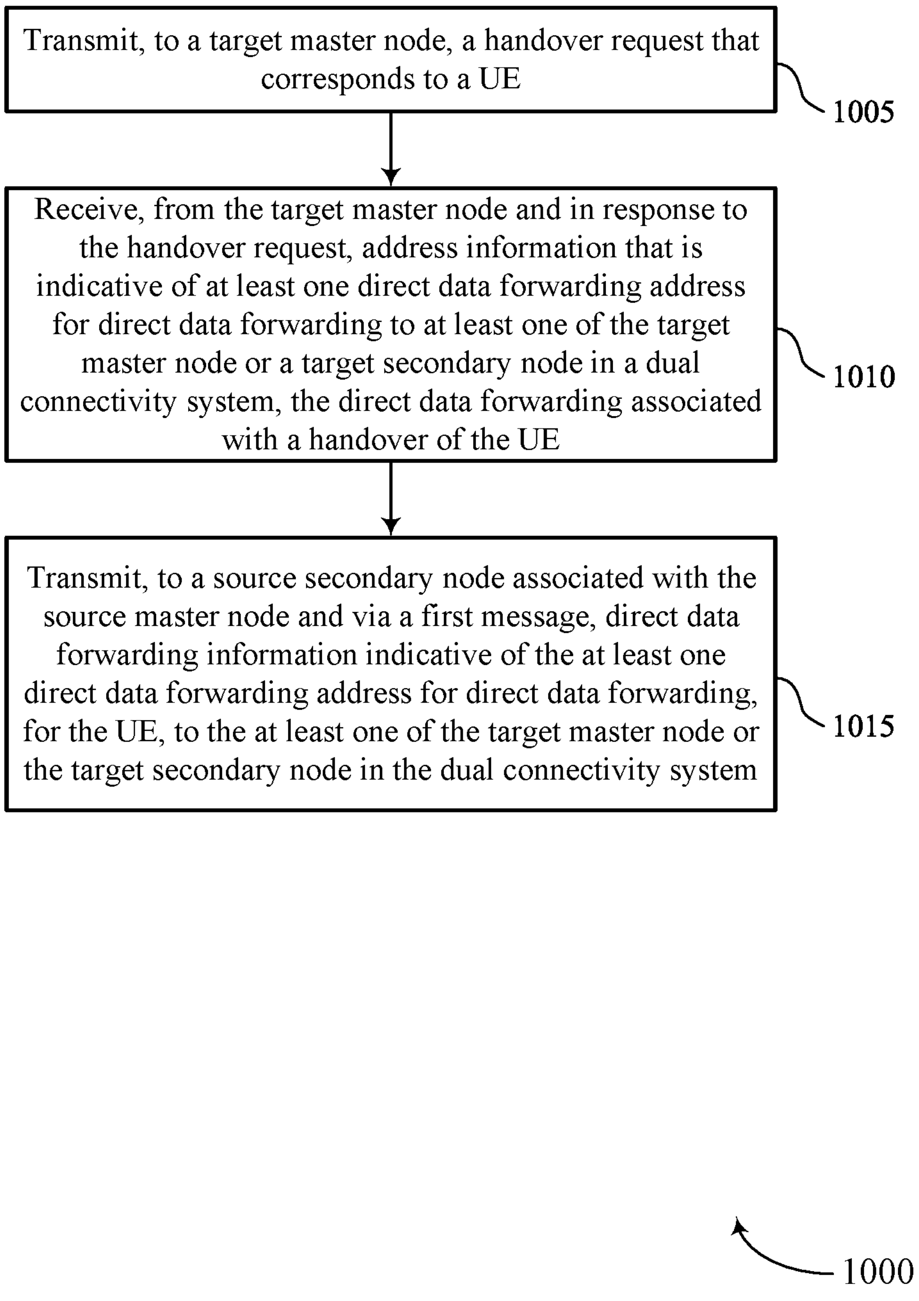

FIG. 10 illustrates a flowchart showing a method 1000 that supports direct data forwarding for user equipment handover in accordance with one or more aspects of the present disclosure. The operations of the method 1000 may be implemented by a network entity or its components as described herein. For example, the operations of the method 1000 may be performed by a network entity as described with reference to FIGS. 1 through 7. In some examples, a network entity may execute a set of instructions to control the functional elements of the network entity to perform the described functions. Additionally, or alternatively, the network entity may perform aspects of the described functions using special-purpose hardware.

At 1005, the method may include transmitting, to a target master node, a handover request that corresponds to a UE. The operations of 1005 may be performed in accordance with examples as disclosed herein. In some examples, aspects of the operations of 1005 may be performed by a handover request component 640 as described with reference to FIG. 6.

At 1010, the method may include receiving, from the target master node and in response to the handover request, address information that is indicative of at least one direct data forwarding address for direct data forwarding to at least one of the target master node or a target secondary node in a dual connectivity system, the direct data forwarding associated with a handover of the UE. The operations of 1010 may be performed in accordance with examples as disclosed herein. In some examples, aspects of the operations of 1010 may be performed by a handover request acknowledge component 645 as described with reference to FIG. 6.

At 1015, the method may include transmitting, to a source secondary node associated with the source master node and via a first message, direct data forwarding information indicative of the at least one direct data forwarding address for direct data forwarding, for in the dual connectivity system the UE, to the at least one of the target master node or the target secondary node. The operations of 1015 may be performed in accordance with examples as disclosed herein. In some examples, aspects of the operations of 1015 may be performed by a secondary node address indication component 650 as described with reference to FIG. 6.

Figure 11:
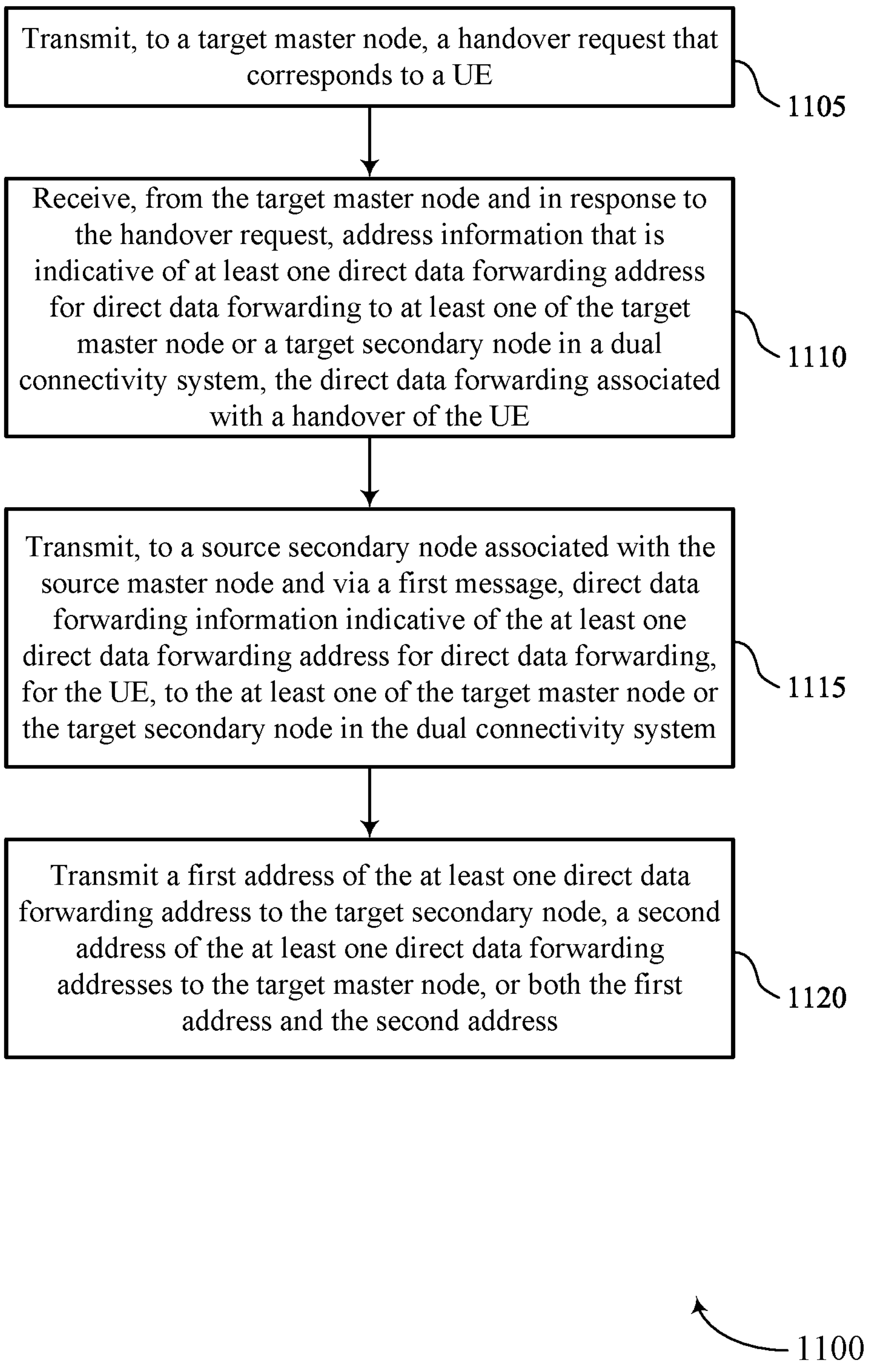

FIG. 11 illustrates a flowchart showing a method 1100 that supports direct data forwarding for user equipment handover in accordance with one or more aspects of the present disclosure. The operations of the method 1100 may be implemented by a network entity or its components as described herein. For example, the operations of the method 1100 may be performed by a network entity as described with reference to FIGS. 1 through 7. In some examples, a network entity may execute a set of instructions to control the functional elements of the network entity to perform the described functions. Additionally, or alternatively, the network entity may perform aspects of the described functions using special-purpose hardware.

At 1105, the method may include transmitting, to a target master node, a handover request that corresponds to a UE. The operations of 1105 may be performed in accordance with examples as disclosed herein. In some examples, aspects of the operations of 1105 may be performed by a handover request component 640 as described with reference to FIG. 6.

At 1110, the method may include receiving, from the target master node and in response to the handover request, address information that is indicative of at least one direct data forwarding address for direct data forwarding to at least one of the target master node or a target secondary node in a dual connectivity system, the direct data forwarding associated with a handover of the UE. The operations of 1110 may be performed in accordance with examples as disclosed herein. In some examples, aspects of the operations of 1110 may be performed by a handover request acknowledge component 645 as described with reference to FIG. 6.

At 1115, the method may include transmitting, to a source secondary node associated with the source master node and via a first message, direct data forwarding information indicative of the at least one direct data forwarding address for direct data forwarding, for the UE, to the at least one of the target master node or the target secondary node in a dual connectivity system. The operations of 1115 may be performed in accordance with examples as disclosed herein. In some examples, aspects of the operations of 1115 may be performed by a secondary node address indication component 650 as described with reference to FIG. 6.

At 1120, the method may include transmitting a first address of the at least one direct data forwarding address to the target secondary node, a second address of the at least one direct data forwarding address to the target master node, or both the first address and the second address. The operations of 1120 may be performed in accordance with examples as disclosed herein. In some examples, aspects of the operations of 1120 may be performed by a secondary node address indication component 650 as described with reference to FIG. 6.

Figure 12:
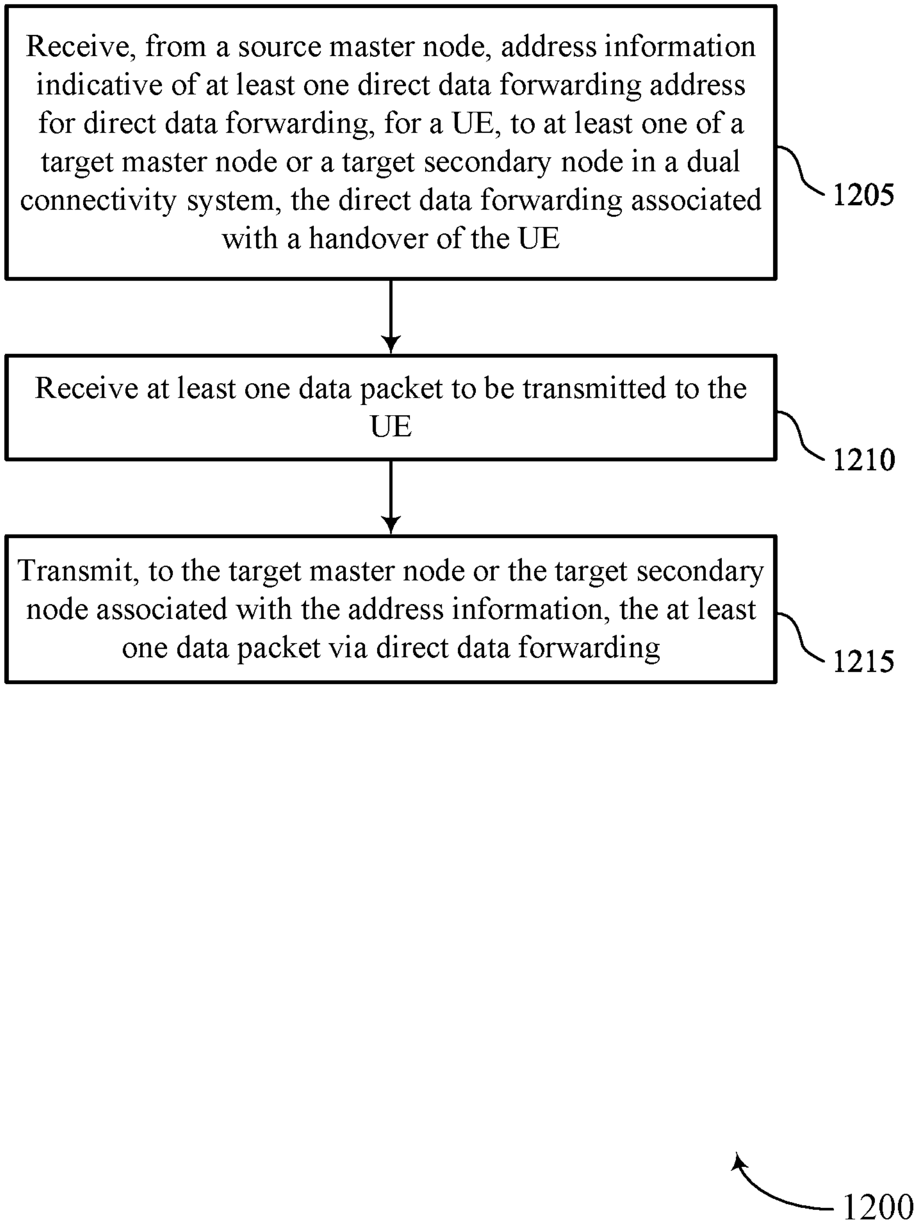

FIG. 12 illustrates a flowchart showing a method 1200 that supports direct data forwarding for user equipment handover in accordance with one or more aspects of the present disclosure. The operations of the method 1200 may be implemented by a network entity or its components as described herein. For example, the operations of the method 1200 may be performed by a network entity as described with reference to FIGS. 1 through 7. In some examples, a network entity may execute a set of instructions to control the functional elements of the network entity to perform the described functions. Additionally, or alternatively, the network entity may perform aspects of the described functions using special-purpose hardware.

At 1205, the method may include receiving, from a source master node, address information indicative of at least one direct data forwarding address for direct data forwarding, for a UE, to at least one of a target master node or a target secondary node in a dual connectivity system, the direct data forwarding associated with a handover of the UE. The operations of 1205 may be performed in accordance with examples as disclosed herein. In some examples, aspects of the operations of 1205 may be performed by a secondary node address indication component 650 as described with reference to FIG. 6.

At 1210, the method may include receiving at least one data packet to be transmitted to the UE. The operations of 1210 may be performed in accordance with examples as disclosed herein. In some examples, aspects of the operations of 1210 may be performed by a packet interface 655 as described with reference to FIG. 6.

At 1215, the method may include transmitting, to the target master node or the target secondary node associated with the address information, the at least one data packet via direct data forwarding. The operations of 1215 may be performed in accordance with examples as disclosed herein. In some examples, aspects of the operations of 1215 may be performed by a direct data forwarding component 660 as described with reference to FIG. 6.

The following provides an overview of aspects of the present disclosure:

Aspect 1: A method for wireless communication at a target master node, comprising: receiving, from a source master node, a handover request that corresponds to a UE; transmitting, responsive to the handover request and to a target secondary node associated with the target master node in a dual connectivity system, via a first message, a secondary node identifier for a source secondary node associated with the source master node in the dual connectivity system; receiving via a second message responsive to the first message, information indicative of whether a direct data forwarding path is available between the target secondary node and the source secondary node; and transmitting, to the source master node and in response to the second message, address information indicative of at least one direct data forwarding address for direct data forwarding from the source secondary node in association with a handover of the UE.

Aspect 2: The method of aspect 1, wherein transmitting the address information comprises: transmitting a first address for direct data forwarding from the source secondary node to the target master node, a second address for direct data forwarding from the source secondary node to the target secondary node, or both the first address and the second address.

Aspect 3: The method of any of aspects 1 through 2, wherein transmitting the address information comprises: transmitting an indication that direct data forwarding is available from the source secondary node to the target secondary node.

Aspect 4: The method of any of aspects 1 through 3, wherein transmitting the address information comprises: transmitting the address information via a handover request acknowledge message.

Aspect 5: The method of any of aspects 1 through 4, wherein receiving the information indicative of whether the direct data forwarding path is available comprises: receiving, from the target secondary node, an address for direct data forwarding from the source secondary node to the target secondary node for data associated with a data radio bearer between the source secondary node and the UE.

Aspect 6: The method of any of aspects 1 through 5, wherein receiving the information indicative of whether the direct data forwarding path is available comprises: receiving, from the target secondary node, a first address for direct data forwarding from the source secondary node to the target secondary node.

Aspect 7: The method of any of aspects 1 through 6, wherein the information indicative of whether the direct data forwarding path is available comprises: receiving the information via a secondary node addition request acknowledge message.

Aspect 8: The method of any of aspects 1 through 7, further comprising: transmitting the secondary node identifier to a plurality of target secondary nodes associated with the target master node; and receiving, from each target secondary node of the plurality of target secondary nodes, respective information indicative of whether the direct data forwarding path is available.

Aspect 9: The method of any of aspects 1 through 8, wherein transmitting the first message comprises: transmitting a secondary node addition request message that indicates the secondary node identifier.

Aspect 10: The method of any of aspects 1 through 9, wherein the second message includes information indicative of whether a second direct data forwarding path is available between the source master node and the target secondary node.

Aspect 11: A method for wireless communication at a source master node, comprising: transmitting, to a target master node, a handover request that corresponds to a UE; receiving, from the target master node and in response to the handover request, address information that is indicative of at least one direct data forwarding address for direct data forwarding to at least one of the target master node or a target secondary node in a dual connectivity system, the direct data forwarding associated with a handover of the UE; and transmitting, to a source secondary node associated with the source master node and via a first message, direct data forwarding information indicative of the at least one direct data forwarding address for direct data forwarding, for the UE, to the at least one of the target master node or the target secondary node in the dual connectivity system.

Aspect 12: The method of aspect 11, wherein receiving the address information comprises: receiving, as one of the at least one direct data forwarding address, an address for direct data forwarding from the source secondary node to the target secondary node for data associated with a data radio bearer between the source secondary node and the UE, wherein the address is transmitted to the source secondary node via the first message.

Aspect 13: The method of any of aspects 11 through 12, wherein receiving the address information comprises: receiving, as one of the at least one direct data forwarding address, an address for direct data forwarding from the source secondary node to the target master node for data associated with a data radio bearer between the source secondary node and the UE, wherein the address is transmitted to the source secondary node via the first message.

Aspect 14: The method of any of aspects 11 through 13, wherein receiving the address information comprises: receiving the address information via a handover request acknowledge message.

Aspect 15: The method of any of aspects 11 through 14, wherein transmitting the direct data forwarding information comprises: transmitting a first address of the at least one direct data forwarding address to the target secondary node, a second address of the at least one direct data forwarding address to the target master node, or both the first address and the second address.

Aspect 16: The method of any of aspects 11 through 15, wherein transmitting the direct data forwarding information comprises: transmitting the direct data forwarding information via an address indication message.

Aspect 17: The method of any of aspects 11 through 16, wherein receiving the address information comprises: receiving the address information for direct data forwarding to a plurality of target secondary nodes.

Aspect 18: The method of any of aspects 11 through 17, further comprising: receiving, from the source secondary node, at least one data packet to be transmitted to the UE; and transmitting, to the target secondary node, the at least one data packet for transmission to the UE via indirect data forwarding.

Aspect 19: A method for wireless communication at a source secondary node, comprising: receiving, from a source master node, address information indicative of at least one direct data forwarding address for direct data forwarding, for a UE, to at least one of a target master node or a target secondary node in a dual connectivity system, the direct data forwarding associated with a handover of the UE; receiving at least one data packet to be transmitted to the UE; and transmitting, to the target master node or the target secondary node associated with the address information, the at least one data packet via direct data forwarding.

Aspect 20: The method of aspect 19, wherein receiving the address information comprises: receiving the at least one direct data forwarding address for direct data forwarding from the source secondary node to the target secondary node for data associated with a data radio bearer between the source secondary node and the UE, wherein the at least one data packet is transmitted to the target secondary node in accordance with the address information.

Aspect 21: The method of any of aspects 19 through 20, wherein receiving the address information comprises: receiving the at least one direct data forwarding address for direct data forwarding from the source secondary node to the target master node for data associated with a data radio bearer between the source secondary node and the UE, wherein the at least one data packet is transmitted to the target master node in accordance with the address information.

Aspect 22: An apparatus for wireless communication at a target master node, comprising one or more memories storing processor-executable code, one or more processors coupled with the one or more memories and individually or collectively operable to execute the code to cause the apparatus to perform a method of any of aspects 1 through 10.

Aspect 23: An apparatus for wireless communication at a target master node, comprising at least one means for performing a method of any of aspects 1 through 10.

Aspect 24: A non-transitory computer-readable medium storing code for wireless communication at a target master node, the code comprising instructions executable by a processor to perform a method of any of aspects 1 through 10.

Aspect 25: An apparatus for wireless communication at a source master node, comprising one or more memories storing processor-executable code, one or more processors coupled with the one or more memories and individually or collectively operable to execute the code to cause the apparatus to perform a method of any of aspects 11 through 18.

Aspect 26: An apparatus for wireless communication at a source master node, comprising at least one means for performing a method of any of aspects 11 through 18.

Aspect 27: A non-transitory computer-readable medium storing code for wireless communication at a source master node, the code comprising instructions executable by a processor to perform a method of any of aspects 11 through 18.

Aspect 28: An apparatus for wireless communication at a source secondary node, comprising one or more memories storing processor-executable code, one or more processors coupled with the one or more memories and individually or collectively operable to execute the code to cause the apparatus to perform a method of any of aspects 19 through 21.

Aspect 29: An apparatus for wireless communication at a source secondary node, comprising at least one means for performing a method of any of aspects 19 through 21.

Aspect 30: A non-transitory computer-readable medium storing code for wireless communication at a source secondary node, the code comprising instructions executable by a processor to perform a method of any of aspects 19 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers.

Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a target master node, comprising:

one or more memories storing processor-executable code; and one or more processors coupled with the one or more memories and individually or collectively operable to execute the code to cause the apparatus to:

receive, from a source master node, a handover request that corresponds to a user equipment (UE);

transmit, responsive to the handover request and to a plurality of target secondary nodes associated with the target master node in a dual connectivity system, via a one or more first messages, a secondary node identifier for a source secondary node associated with the source master node in the dual connectivity system;

receive via a second message responsive to the one or more first messages, information indicative of whether a direct data forwarding path is available between a target secondary node of the plurality of target secondary nodes and the source secondary node; and transmit, to the source master node and in response to the second message, address information indicative of at least one direct data forwarding address for direct data forwarding from the source secondary node in association with a handover of the UE.

2. The apparatus of claim 1, wherein, to transmit the address information, the one or more processors are individually or collectively further operable to execute the code to cause the apparatus to:

transmit a first address for direct data forwarding from the source secondary node to the target master node, a second address for direct data forwarding from the source secondary node to the target secondary node, or both the first address and the second address.

3. The apparatus of claim 1, wherein, to transmit the address information, the one or more processors are individually or collectively further operable to execute the code to cause the apparatus to:

transmit an indication that direct data forwarding is available from the source secondary node to the target secondary node.

4. The apparatus of claim 1, wherein, to transmit the address information, the one or more processors are individually or collectively further operable to execute the code to cause the apparatus to:

transmit the address information via a handover request acknowledge message.

5. The apparatus of claim 1, wherein, to receive the information indicative of whether the direct data forwarding path is available, the one or more processors are individually or collectively further operable to execute the code to cause the apparatus to:

receive, from the target secondary node, an address for direct data forwarding from the source secondary node to the target secondary node for data associated with a data radio bearer between the source secondary node and the UE.

6. The apparatus of claim 1, wherein, to receive the information indicative of whether the direct data forwarding path is available, the one or more processors are individually or collectively further operable to execute the code to cause the apparatus to:

receive, from the target secondary node, a first address for direct data forwarding from the source secondary node to the target secondary node.

7. The apparatus of claim 1, wherein, to receive the information indicative of whether the direct data forwarding path is available, the one or more processors are individually or collectively further operable to execute the code to cause the apparatus to:

receive the information via a secondary node addition request acknowledge message.

8. The apparatus of claim 1, wherein the one or more processors are individually or collectively further operable to execute the code to cause the apparatus to:

receive, from each target secondary node of the plurality of target secondary nodes, respective information indicative of whether the direct data forwarding path is available.

9. The apparatus of claim 1, wherein, to transmit the one or more first messages, the one or more processors are individually or collectively further operable to execute the code to cause the apparatus to:

transmit a secondary node addition request message that indicates the secondary node identifier.

10. The apparatus of claim 1, wherein the second message includes information indicative of whether a second direct data forwarding path is available between the source master node and the target secondary node.

11. An apparatus for wireless communication at a source master node, comprising:

one or more memories storing processor-executable code; and one or more processors coupled with the one or more memories and individually or collectively operable to execute the code to cause the apparatus to:

transmit, to a target master node, a handover request that corresponds to a user equipment (UE);

receive, from the target master node and in response to the handover request, address information that is indicative of a plurality of direct data forwarding addresses for direct data forwarding to a plurality of target secondary nodes in a dual connectivity system, the direct data forwarding associated with a handover of the UE; and transmit, to at least a source secondary node associated with the source master node and via at least a first message, direct data forwarding information indicative of at least one direct data forwarding address of the plurality of direct data forwarding addresses for direct data forwarding, for the UE, to at least one of the plurality of target secondary nodes in the dual connectivity system.

12. The apparatus of claim 11, wherein, to receive the address information, the one or more processors are individually or collectively further operable to execute the code to cause the apparatus to:

receive, as one of the plurality of direct data forwarding addresses, an address for direct data forwarding from the source secondary node to a target secondary node of the plurality of target secondary nodes for data associated with a data radio bearer between the source secondary node and the UE, wherein the address is transmitted to the source secondary node via the first message.

13. The apparatus of claim 11, wherein the one or more processors are individually or collectively further operable to execute the code to cause the apparatus to:

receive, in addition to the plurality of direct data forwarding addresses, an address for direct data forwarding from the source secondary node to the target master node for data associated with a data radio bearer between the source secondary node and the UE, wherein the address is transmitted to the source secondary node via the first message.

14. The apparatus of claim 11, wherein, to receive the address information, the one or more processors are individually or collectively further operable to execute the code to cause the apparatus to:

receive the address information via a handover request acknowledge message.

15. The apparatus of claim 11, wherein, to transmit the direct data forwarding information, the one or more processors are individually or collectively further operable to execute the code to cause the apparatus to:

transmit a first address of the plurality of direct data forwarding addresses to a target secondary node of the plurality of target secondary nodes, a second address of the plurality of direct data forwarding addresses to the target master node, or both the first address and the second address.

16. The apparatus of claim 11, wherein, to transmit the direct data forwarding information, the one or more processors are individually or collectively further operable to execute the code to cause the apparatus to:

transmit the direct data forwarding information via an address indication message.

17. The apparatus of claim 11, the one or more processors are individually or collectively further operable to execute the code to cause the apparatus to:

receive, from the source secondary node, at least one data packet to be transmitted to the UE; and transmit, to a target secondary node of the plurality of target secondary nodes, the at least one data packet for transmission to the UE via indirect data forwarding.

18. A method for wireless communication at a target master node, comprising:

receiving, from a source master node, a handover request that corresponds to a user equipment (UE);

transmitting, responsive to the handover request and to a plurality of target secondary nodes associated with the target master node in a dual connectivity system, via a first message, a secondary node identifier for a source secondary node associated with the source master node in the dual connectivity system;

receiving via a second message responsive to the first message, information indicative of whether a direct data forwarding path is available between a target secondary node of the plurality of target secondary nodes and the source secondary node; and transmitting, to the source master node and in response to the second message, address information indicative of at least one direct data forwarding address for direct data forwarding from the source secondary node in association with a handover of the UE.

19. The method of claim 18, wherein transmitting the address information comprises:

transmitting an indication that direct data forwarding is available from the source secondary node to the target secondary node.

* * * * *